(12) United States Patent
Skyum et al.

(10) Patent No.: US 12,338,082 B2
(45) Date of Patent: Jun. 24, 2025

(54) PICK AND PLACE ROBOT SYSTEM, METHOD, USE AND SORTER SYSTEM

(71) Applicant: BEUMER Group A/S, Aarhus N (DK)

(72) Inventors: Henrik Frank Skyum, Hadsten (DK); Andreas Werner, Dortmund (DE)

(73) Assignee: BEUMER Group A/S, Aarhus N (DK)

( * ) Notice: Subject to any disclaimer, the term of this patent is extended or adjusted under 35 U.S.C. 154(b) by 284 days.

(21) Appl. No.: 17/916,592

(22) PCT Filed: Mar. 26, 2021

(86) PCT No.: PCT/EP2021/057875
§ 371 (c)(1),
(2) Date: Oct. 3, 2022

(87) PCT Pub. No.: WO2021/198053
PCT Pub. Date: Oct. 27, 2021

(65) Prior Publication Data
US 2023/0150777 A1   May 18, 2023

(30) Foreign Application Priority Data
Apr. 3, 2020   (EP) .................................... 20167914

(51) Int. Cl.
*B65G 47/91* (2006.01)
*B07C 5/36* (2006.01)
*B25J 9/16* (2006.01)

(52) U.S. Cl.
CPC ............ *B65G 47/917* (2013.01); *B07C 5/361* (2013.01); *B25J 9/163* (2013.01); *B65G 47/914* (2013.01);
(Continued)

(58) Field of Classification Search
CPC .. B65G 47/917; B65G 47/914; B65G 47/918; B65G 2203/0233; B65G 2203/041;
(Continued)

(56) References Cited

U.S. PATENT DOCUMENTS 5,988,716 A * 11/1999 Liao .................. A63B 47/02
294/19.2
5,988,718 A   11/1999 Sugimoto
(Continued)

FOREIGN PATENT DOCUMENTS

DE  10 2013 105 383 B3   7/2014
EP         3 056 289 A1   8/2016
(Continued)

OTHER PUBLICATIONS

International Search Report and Written Opinion issued in related PCT/EP2021/057875 on May 27, 2021 (pp. 12).
(Continued)

*Primary Examiner* — Sihar A Karwan
(74) *Attorney, Agent, or Firm* — Woodard, Emhardt, Henry, Reeves & Wagner, LLP

(57) ABSTRACT

A robot system for picking randomly shaped and sized object from a continuously moving stream of objects in bulk, e.g. a 3D bulk, and placing the object singulated and aligned on an induction or directly on a sorter. A pick and place robot has a robotic actuator for moving a gripper with a controllable gripping configuration of its gripping members, e.g. four suction cups, to adapt the gripper for various objects. A control system processes a 3D image of objects upstream of a position of the pick and place robot, identifies separate objects in the 3D image, and selects which object to grip, based on parameters of the identified separate objects determined from the 3D image. Based on e.g. size and shape of the selected object to grip, the gripping configuration of the
(Continued)

gripper is adjusted to match the surface of the object to grip for optimal gripping. The robotic actuator, e.g. a gantry type robotic actuator, is then controlled to move the gripper to a position for gripping the object, and afterwards move the gripper with the gripped object to a target position and with a target orientation to release grip of the object and thus place the object on an induction or directly on a sorter. An image after placing the object along with properties of the object determined from the 3D image can be used as input to a machine learning for online improving pick and place performance of the robot system, e.g. for online improving the algorithm for selection of which object to pick, and also for selection of the appropriate gripping configuration to match the object.

17 Claims, 6 Drawing Sheets

(52) U.S. Cl.
CPC .... *B65G 47/918* (2013.01); *B65G 2203/0233* (2013.01); *B65G 2203/041* (2013.01)
(58) Field of Classification Search
CPC ... B07C 5/361; B07C 5/02; B07C 2501/0063; B07C 5/36; B25J 9/163; B25J 9/1697; B25J 9/0093; B25J 11/00; B25J 19/02; G05B 2219/40053; G05B 2219/40607; G05B 2219/45063; G05B 19/4182; Y02P 90/02
See application file for complete search history.

(56) References Cited

U.S. PATENT DOCUMENTS

| | | | | |
|---|---|---|---|---|
| 6,934,605 | B1* | 8/2005 | Dothan | G05B 19/41815 29/784 |
| 9,004,846 | B2* | 4/2015 | La Rovere | B25J 15/0616 414/737 |
| 9,789,517 | B2* | 10/2017 | Doublet | B07C 5/02 |
| 10,399,227 | B1* | 9/2019 | Islam | B25J 9/1697 |
| 10,974,386 | B2* | 4/2021 | Shimodaira | B25J 9/1671 |
| 2003/0037515 | A1* | 2/2003 | Herzog | B65B 5/105 53/493 |
| 2003/0069666 | A1* | 4/2003 | Nagler | G05B 19/4182 700/219 |
| 2004/0094979 | A1* | 5/2004 | Damhuis | B25J 15/0616 294/65 |
| 2007/0282485 | A1* | 12/2007 | Nagatsuka | G05B 19/4069 700/245 |
| 2013/0166061 | A1* | 6/2013 | Yamamoto | B25J 9/1669 700/214 |
| 2017/0165717 | A1* | 6/2017 | Crest | B65G 47/26 |
| 2017/0355078 | A1* | 12/2017 | Ur | G06T 7/12 |
| 2017/0368693 | A1* | 12/2017 | Chinatalapalli Patta | B25J 15/0616 |
| 2018/0056333 | A1* | 3/2018 | Hicham | B07C 3/08 |
| 2018/0233397 | A1 | 8/2018 | Hosek | |
| 2018/0345324 | A1* | 12/2018 | Hillerich, Jr. | B07C 5/3422 |
| 2019/0070728 | A1* | 3/2019 | Wertenberger | B25J 9/1697 |
| 2019/0076883 | A1* | 3/2019 | Njluland | B65B 35/58 |
| 2019/0084153 | A1* | 3/2019 | Witt | B25J 9/1679 |
| 2019/0259177 | A1* | 8/2019 | Hoelscher | G06T 7/344 |
| 2019/0308325 | A1* | 10/2019 | Higo | B65B 59/02 |
| 2020/0277139 | A1* | 9/2020 | Nakano | B65G 1/1373 |
| 2020/0361083 | A1* | 11/2020 | Mousavian | G06N 3/063 |
| 2021/0197391 | A1* | 7/2021 | Ohnishi | B25J 19/023 |
| 2022/0072587 | A1 | 3/2022 | Gealy | |
| 2023/0102238 | A1* | 3/2023 | Ushiyama | B65G 47/91 700/258 |
| 2023/0182313 | A1 | 6/2023 | Nielsen et al. | |

FOREIGN PATENT DOCUMENTS

| | | |
|---|---|---|
| EP | 3106271 A2 | 12/2016 |
| EP | 3 260 247 A1 | 12/2017 |
| EP | 3 256 267 B1 | 1/2019 |
| EP | 3 456 485 B1 | 2/2021 |
| JP | 05065437 U | 8/1993 |
| JP | H09131685 A | 5/1997 |
| JP | H11156777 A | 6/1999 |
| JP | 2001239484 A | 9/2001 |
| JP | 2014504562 A | 2/2014 |
| JP | 2017064910 A | 4/2017 |
| JP | 2018122370 A | 8/2018 |
| JP | 2018176313 A | 11/2018 |
| JP | 2019005869 A | 1/2019 |
| JP | 2019051559 A | 4/2019 |
| KR | 20100008158 U | 8/2010 |
| TW | 201927632 A | 7/2019 |
| WO | WO 2014/041318 A1 | 3/2014 |
| WO | WO 2015/032402 A1 | 3/2015 |
| WO | WO 2016/067163 A1 | 5/2016 |
| WO | WO 2016/102822 A1 | 6/2016 |
| WO | WO 2019/207200 A1 | 10/2019 |
| WO | WO 2020021643 A1 | 1/2020 |

OTHER PUBLICATIONS

International Search Report and Written Opinion issued in related PCT/EP2021/057887 on Jun. 9, 2021 (pp. 17).
Luo, et al; Vision-Based 3-D Object Pick-and-Place Tasks of Industrial Manipulator; Department of Electrical Engineering, National Cheng Kung University, Taiwan (pp. 7).
Machine translation of DE102013105383B3 by PatDocs PDF on Nov. 28, 2022 (pp. 20).
Machine translation of EP3106271A2 by PatDocs on Sep. 28, 2022 (pp. 17).
Machine translation of JP2001239484A by PatDocs on Sep. 28, 2022 (pp. 12).
Machine translation of JP2019005869A by PatDocs on Sep. 28, 2022 (pp. 18).
Machine translation of JPH09131685A by PatDocs on Sep. 28, 2022 (pp. 25).
Machine translation of KR20100008158U by PatDocs on Sep. 28, 2022 (pp. 11).
Machine translation of TW201927632A by PatDocs PDF on Nov. 28, 2022 (pp. 20).
Machine translation of WO2014/041318A1 by PatDocs PDF on Nov. 28, 2022 (pp. 16).
Tsourveloudis, et al; Position and Suction Control of a Reconfigurable Robotic Gripper; Machine Intelligence & Robotic Control, vol. 1, No. 2, 53-62 (1999) (pp. 10).
Machine translation of JP2017064910A by PatDocs PDF Export on Jul. 5, 2024 (pp. 48).
Machine translation of JP2019005869A by PatDocs PDF Export on Jul. 5, 2024 (pp. 18).
Machine translation of JP05-065437, U(1993) by J-Plat Pat on Jan. 20, 2025 (pp. 4).
Machine translation of JP2014504562A by PatDocs PDF Export on Jan. 21, 2025 (pp. 24).
Machine translation of JP2019051559A by PatDocs PDF Export on Jan. 21, 2025 (pp. 42).
Machine translation of JPH09131685A by PatDocs PDF Export on Jan. 21, 2025 (pp. 25).
Machine translation of JPH11156777A by PatDocs PDF Export on Jan. 21, 2025 (pp. 22).
Machine translation of KR20100008158U by PatDocs PDF Export on Jan. 21, 2025 (pp. 10).
Machine translation of JP2018122370A by PatDocs PDF Export on Feb. 18, 2025 (pp. 17).
Machine translation of JP2018176313A by PatDocs PDF Export on Feb. 18, 2025 (pp. 23).

(56) References Cited

OTHER PUBLICATIONS

Machine translation of WO2020021643A1 by PatDocs PDF Export on Feb. 18, 2025 (pp. 23).

* cited by examiner

PICK AND PLACE ROBOT SYSTEM, METHOD, USE AND SORTER SYSTEM

FIELD OF THE INVENTION

The present invention relates to robot systems. Specifically, the invention relates to pick and place robot systems for picking up objects from a bulk of objects, especially a 3D bulk of objects, and placing them, e.g. singulated and oriented, at a target position, especially on an induction to a sorter or directly on a running sorter. The robot system is suitable for such as: handling mail pieces, parcels, baggage, softbags, limp/non-rigid bags, polybags, items handled at a warehouse distribution, and items handled at a mail order distribution centre.

BACKGROUND OF THE INVENTION

Sorters, such as for sorting mail and/or parcels or the like, normally include a sorter system for transporting items at a constant speed to a discharge position, and in accordance with a code or the like on the individual objects, the objects are received and discharged from the sorter at a given discharge position.

Objects are often inducted to the sorter from a number of inductions which receive an object in one end and they serve to accelerate the object and deliver the object at an empty position on the sorter, e.g. an empty cross belt or tilt tray element. An induction accelerates an object up to a velocity with a directional component parallel with the sorter velocity, which equals or at least approximately equals the sorter velocity. The inductions may be manually loaded with items, i.e. a person picks up individual items from a feeding conveyor, e.g. from a bulk, and places them singulated and oriented on an induction. In sorter systems without automated inductions for handling the induction to the sorter, persons perform the rather unpleasant task of manually inducting objects to the sorter.

Pick and place robot systems may replace humans picking up of objects and placing the object on an induction or directly on a sorter. However, the task of picking up objects which are randomly sized, shaped and textured, and placed in bulk on a continuous moving feeder is a complicated task. Especially, it is complicated for a robot to pick and place such objects from bulk with a high rate of success and at the same time at the high throughput required for typical mail and parcel conveyors.

SUMMARY OF THE INVENTION

In particular, it may be seen as an object of the present invention to provide a reliable and fast robot system for picking and placing objects from a randomly shaped and sized bulk of objects from a conveyor, e.g. a step-wise or continuously moving conveyor, or from a disc.

In a first aspect, the invention provides a robot system arranged to pick an object from objects in bulk e.g. a 3D bulk, e.g. a continuously moving stream of objects in bulk, and to place the object, e.g. singulated and/or oriented, at a target position on an induction to a sorter or directly on a sorter, the system comprising a pick and place robot comprising
  a controllable gripper comprising a plurality of gripping members arranged to engage with a surface of the object to grip the object, wherein the plurality of gripping members are arranged in a controllable gripping configuration, and
  a controllable robotic actuator arranged to move the controllable gripper,
a sensor system arranged to provide an image of objects upstream of a position of the pick and place robot, and
a control system arranged to receive said image and to execute a control algorithm arranged to
  identify objects in response to said image,
  select which one of the identified objects to grip,
  control the gripping configuration of the plurality of gripping members in response to properties of the selected object determined from said image,
  control the controllable robotic actuator to move the controllable gripper to a position for gripping the selected object, and control the controllable gripper to grip the selected object,
  control the controllable robotic actuator and the controllable gripper to move the object and to release the object, e.g. singulated and/or oriented, at the target position, and
  provide an image of the object at the target position, such as comprising a sensor system arranged to provide the image of the object at the target position.

Such robot system has proven to be capable of providing a high rate of success in picking up objects and placing them at the target position at a high speed, thus providing a high throughput. The robot can be formed by rather simple standard components, and still, due to the defined elements and the defined control system, it has been found that it is possible to pick up an object from the bulk, e.g. 3D bulk, even though the bulk moves at a constant speed. Thus, picking an object from a moving 3D bulk of objects which may even have random unknown shapes, is a very complicated task for a robot system to handle in an effective manner.

The invention is based on the insight that a combination of a rather simple input in the form of an image, preferably a 3D image, of incoming objects before arriving at the pick and place robot is enough to allow suitable processing and control algorithms to provide a high pick and place success rate even in spite the fact that objects have unknown size and shape, are placed in bulk and even in setups where the bulk continuously moves when arriving at the pick and place robot. The selecting of object to pick, and adjusting configuration of the gripper to match the size and shape of the object to be picked are found to provide a flexible robot system which can accept a large variety of objects of different sizes and types arriving in random order. Further, it has been found that the control algorithms performing the tasks can advantageously be trained with learning algorithms to optimize pick and place performance, and this can even be performed continuously, during normal operation of the robot system. This allows the robot to adapt to changes in the pick and place task, e.g. new type of objects not previously handled.

Providing an image of the object after it is released at the target position provides several possibilities of feedback, e.g. merely to output a rate of pick and place successes, but also it may provide feedback to the control system to improve allow improvement of the pick and place performance of the robot system.

Furthermore, providing an image of the object after it is released at the target position allows an immediate feedback of performance of the robot system. Thus, any malfunction can quickly be detected, e.g. any malfunction of the gripper, the image sensor system or the robotic actuator etc. E.g. the control system may generate an alarm signal in case images of objects at the target position indicate that any error has occurred. A fast reaction to such malfunction is important for a high capacity pick and place system to allow a possible stop and repair of the robot system.

Especially, an embodiment of the robot system has been tested with an incoming bulk of objects at a constant speed of such as 0.1-1.0 m/s, and with incoming bulk objects of various sizes, shapes and textures, a rate of success of 98-100%, at a speed of up to such as 1,500-2,000 handled objects per hour, depending on the layout of the system and the pick and place distances. The test has been performed with objects including rectangular shaped boxes of various size as well as plastic bags, laminated objects etc. A throughput of more than 2,000 objects per hour may be obtained.

The robot system has been found to provide a pick and place performance speed and reliability which allows the robot system to be used for mail pieces, parcels, baggage, items handled at a warehouse distribution, and items handled at a mail order distribution centre etc.

By 'robotic actuator' is generally understood a controllable device with a manipulator arm, preferably having at least 2 joints or axes and being controllable to move the gripper from one position in space to another position in space, i.e. basically the robotic actuator can move the gripper to a controllable position in space.

By 'singulated' is understood objects placed with a distance from each other. Preferably, objects are further placed both singulated and oriented, and by 'oriented' is understood aligned with an orientation of an induction, a conveyor or a sorter or the like.

By 'image of objects' is understood a sensed or measured representation of the physical configuration of objects. Preferably, the image has a sufficient level of detail to identify or classify single objects from a bulk of objects by means of appropriate processing. The image may be a visual image, e.g. obtained by a 2D or 3D camera. However, other technologies may be used as well, e.g. using laser scanners or other scanner technologies providing an image by non-visual sensing or measurement techniques etc.

In general, 'image' and 'providing an image' is to be understood to including any representation of such image and any way of providing the image. Especially, the image maybe provided as digital image data, e.g. data captured using a 2D or 3D sensor or sensor system as known in the art.

By '3D bulk' is understood, as normally used in the art, i.e. a bulk of objects that are arranged in a random way in relation to each other in three dimensions, thus a bulk of objects can especially include objects placed on top of each other and next to each other in any random configuration.

The pick and place robots described throughout the description are suited for picking objects from a 3D bulk of objects, however it is understood that the robots can pick objects also from 2D bulk of objects or single objects.

In the following, preferred embodiments and features will be described.

In preferred embodiments, the controllable robotic actuator comprises a Cartesian type of robot actuator, such as a gantry type of robotic actuator. Such types of robotic actuators have proven to be suitable for positioning with its major horizontal axis of extension extending from a gripping area on a feeding conveyor transporting the continuously moving stream of objects, and extending to the target position within a target area on an associated sorter or an induction to a sorter. The Cartesian, e.g. gantry, robot actuator is preferably arranged to move the controllable gripper in a three dimensional coordinate system (X, Y, Z), thus allowing the gripper to be navigated within a limited space. Preferably, the angle of the gripper can be controlled as well, thus having at least 4 degrees of freedom. Preferably, the robotic actuator is controllable to move the gripper along a predetermined trajectory within the limited space, e.g. hereby allowing the gripper to be navigated to grip an object in a space between two high objects.

Most preferably, the gripper can be controlled to roll, pitch and yaw for further improved navigation. Such gripper has been found to be suitable for effective gripping of an object from a 3D bulk of objects.

In some embodiments, the robot system is arranged to place the object singulated and/or oriented on a target position on an induction to a sorter, e.g. a regular induction component or a simple band conveyor serving as induction to a sorter. In some embodiments, the controllable robotic actuator is arranged to accelerate the object in a direction of a continuously moving sorter, after the object has been picked up, and to place the object singulated and/or oriented at a target position directly on the sorter at a velocity of the sorter, e.g. on a cross belt or on a tilt tray, or approximately at the velocity of the sorter.

The sensor system can in principle be based on any type of sensor technology that can sense or measure a physical property data that can be processed to provide an image, most preferably a 3D image. The sensor system is preferably arranged to provide at least a 2D image, e.g. a regular 2D black and white, grey tone or color photo with a high resolution to allow precise identification of contours of objects in the image. Preferably, the sensor system is arranged to provide a 3D image, e.g. in the form of a 2D image with additional height information. 3D image information with a high resolution, e.g. 1-2 mm precision, allows a high possibility of identifying features by image processing to allow identification of separate objects and further characteristics or features of the objects. Further, height information in the image is preferred for precise control of the robotic actuator to move the gripper according to a planned route to a position for gripping the object. The 3D image can be provided by a 3D camera being at least one of: a 3D line camera system (a 2D line camera combined with movement), a Time of Flight type 3D camera, and a stereo 3D camera or the like. Other technologies may be used, such as regular 2D camera followed by an image processing algorithm to generate the height information based on the 2D image, thus generating effectively a 3D image.

In a preferred embodiment, the sensor system comprises a 2D or 3D camera placed at a fixed position above the moving stream of objects. Preferably, the sensor system is arranged to provide still images covering a fixed area upstream of the position of the pick and place robot and at a distance of the pick and place robot.

Based on the image, the control algorithm may both identify objects and classify objects. Preferably, the step of identifying objects comprises analysing the image to discriminate between single objects in the bulk of objects, thus identifying single objects in the bulk as the basis for deciding which object to pick first. Further, the objects may be classified with respect to various parameters based on analysis of the image. E.g. for each identified object, a centre of gravity may be determined, which has an influence on where to place the gripping members of the gripper to grip the object with the highest possible rate of success.

In some embodiments, a sensor is arranged to sense a height of the object after it has been picked up by the controllable gripper. Especially, the control system is connected to said sensor and to receive information indicative of the height of the object, and being arranged to control the controllable gripper and the controllable robotic actuator to release grip of the object at a height above the target position in response to said information indicative of the height of the object. This allows the robot system to place a small object with an unknown height gently on the target position without dropping it from a too high position above the target position, or without pressing an unexpected high object onto the induction or sorter. E.g. this solves the problem of picking an object from a stack of objects, thus not knowing the height of the object based on the picking height above the feeding conveyor or disc. Even further, the height sensor prevents damage of the gripper.

The sensor arranged to provide an image of an object after being placed at the target position may, as already described for the sensor system providing the initial image, be any type of technology that can provide an image of the object. E.g. such sensor may comprise a 2D or 3D camera placed on the pick and place robot, or at a fixed position separate from the pick and place robot. This allows evaluation of how the object is placed compared to the target position, and thus evaluation of the total pick and place performance. Further, by comparing with the initial image, i.e. the part of the image containing the specific object before it is picked up, the orientation and other characteristics or features of the object may be compared. This can be used in a machine learning feedback, or standard feedback solution, to the algorithms in the control system, so as to improve the pick and place performance. E.g. to simply discard gripping objects with features or characteristics that have proven to be hard to pick and place in a correct manner, or to primarily select objects with features or characteristics providing a high rate of success. This is relevant in systems with a continuously incoming stream of objects, whereas in other systems, a sensor is placed to monitor for objects in the picking area, so as to control the feeder in a step-wise sequence to ensure that all objects have been picked by the robot before the feeder moves another bulk of objects to be picked by the robot.

Especially, the control system may be arranged to compare the image of the object after being placed at the target position with the object in the image of objects provided by the sensor system. Further, the control system may be arranged to process said image of the object after being placed at the target position, so as to determine at least position of the object relative to the target position, e.g. determine position and orientation of the object relative to the target position. The control system may be arranged to compare at least position of the object relative to the target position and to determine if the position of the object deviates from the target position by more than a predetermined threshold value, e.g. the control system may be arranged to generate an output in response to said determination if the position of the object deviates from the target position by more than a predetermined threshold value. Especially, the control system may be arranged to provide an output indicative of a pick and place performance of the robot system in response to images of a plurality of objects after being placed at the target position. Thus, with such output, the user can continuously evaluate the pick and place performance, e.g. the output can be used to generate an alarm in case the pick and place performance drops, thus indicating an error, e.g. a fault in a component of the robot system.

In some embodiments, the control system is arranged to provide said image of an object after being placed at the target position as a feedback to the control algorithm, preferably a machine learning algorithm. Especially, the control system may be arranged to provide said image of the object after being placed at the target position as a feedback to a part of the control algorithm which selects which object of the identified objects to grip in response to said image. In addition or alternatively, the control system may comprise a learning algorithm arranged to learn characteristics in the image of objects which have a high or low rate of success of being placed at the target position, based on a plurality of images of the objects after being placed at the target position, and to select which object of the identified objects to grip in response to said image in response to an identified object which has characteristics similar to objects with a high or low rate of success of being placed at the target position. Especially, the control system may be programmed to select to grip an identified object with a high rate of success of being placed at the target position, and further be programmed to avoid selecting to grip an identified object which has characteristics similar to objects with a low rate of success of being placed at the target position. The characteristics may comprise one or more of: orientation, dimensions, and type identification. The control algorithm may comprise at least one algorithm part involving an artificial intelligence algorithm and/or a neural network algorithm or similar adaptive algorithm for processing images of objects after being placed at the target position, so as to train the control algorithm in selection of which object of identified objects in the image to grip in order to improve pick and place performance of the robot system.

In preferred embodiments, the controllable gripper comprises
  a base part arranged for mounting on the robotic actuator,
  at least two arms mounted to the base part, wherein each arm
    has a gripping member arranged at or near a distal end of the arm, wherein the gripping member is arranged for engaging with the object for gripping the object, and
    is slidably arranged along its length relative to the base part actuated by a controllable actuator, so as to allow the arm to be controllably adjusted with respect to a position of the gripping member relative to the base part, and
  wherein the at least two arms are slidably arranged in different directions relative to the base part, so as to allow the gripping members to form various gripping configurations with respect to at least size.

Such gripper is flexible with respect to gripping objects of different sizes and shapes, and with an electric, pneumatic or hydraulic actuator, it can be easily shifted from a small and compact version for gripping small objects to a larger gripping configuration with the arms fully extended to grip large objects. Especially, the base part may be formed with compact dimensions, and via the slidable arm arrangement, e.g. four arms can be formed to be very compact in a collapsed state, still being capable of providing a large gripping configuration capable of gripping large objects with the arms fully extended. The compact dimension allows the gripper to navigate within the bulk, also 3D bulk, of objects to grip a small object in between two larger and higher objects.

In a preferred embodiment, the controllable gripper comprises four elongated arms mounted to the base part, wherein the four arms are slidably arranged in different directions relative to the base part, so as to allow the four gripping members to form various gripping quadrangle sizes. Preferably, the each arm has a suction cup mounted on or near its distal end, e.g. positioned so in relation to each other to allow gripping on a surface forming a plane which is parallel with an axis along a length of the arm. A controllable vacuum system is preferably connected to apply vacuum to the suction cups, and wherein the control system is arranged to control the controllable vacuum system so as to control when to apply vacuum to the one or more suction cups for gripping the object, and so as to control when to interrupt vacuum for releasing the object.

The control system may be arranged to control individual controllable actuators for each of the plurality of arms of the controllable gripper to grip the selected object in response to said image. Alternatively, the control system may be arranged to control one single controllable actuator common for all arms. Still further, the control algorithm may be arranged to control at least two controllable actuators for control of the plurality of arms of the controllable gripper to grip the selected object in response to said image, such as one actuator for controlling positions of a set of two arms, and another actuator for controlling positions of another set of two arms.

In preferred embodiments the base part is rotatably mounted to the robotic via a controllable rotation element to allow the base part to perform a controllable rotation around a rotation axis. Preferably, the base part is further mounted to the robotic actuator via a controllable tilting element to allow the base part to perform a controllable tilt around a tilting axis which is perpendicular to said rotation axis. Preferably, the control algorithm is arranged to control said controllable rotation and said controllable tilt of the base part of the controllable gripper to grip the selected object in response to said image.

In specific embodiments, the controllable actuator of the controllable gripper comprises a controllable electric motor connected to actuate at least one of the arms by means of rotation applied via a cable connection. Especially, the controllable electric motor is mounted on a position above a rotation element connecting the base part and the robotic actuator. Especially, the controllable electric motor is mounted on a position above a tilting element connecting the base part and the robotic actuator.

Alternative to or in addition to suction cups, the controllable gripper may have one or more other type of gripping members, e.g. a finger type of elements arranged to contact with sides of an object to grip the object.

To provide extra gripping power for heavy objects, the controllable gripper may have at least one suction cup for gripping the object, wherein said at least one suction cup is mounted with a fixed position on the base part, such as a central part of the base part.

To provide extra flexibility with respect to gripping configuration, one or more arms of the controllable gripper has a comprises a telescopic element.

The control system may be arranged to control the controllable gripper to cause the gripping members to form a predetermined gripping configuration, in order to prepare for gripping the object. Especially, the control system may be arranged to control the controllable gripper to cause the gripping members to enter the predetermined gripping configuration along with the controllable robotic actuator moving the gripper to a predetermined position for gripping the object. This helps to save time for the adjustment of the gripping configuration, especially in case of changing from a small to a large gripping configuration or vice versa.

The robot system preferably has a control system arranged to control the controllable robotic actuator and the controllable gripper to grip a selected object to be picked in response to a plurality of inputs determined from said image. Especially, said plurality of inputs comprises one, and preferably more, of: information regarding a shape of the object, a horizontal boundary of the object, a size of the object, an orientation of the object, an upper surface curvature of the object, and a surface roughness of the object, wherein the control algorithm processes the plurality of inputs according to a predetermined algorithm to arrive at control parameters for controlling the controllable robotic actuator and the controllable gripper so as to grip the object. Especially, the plurality inputs comprises a plurality of, such as all of: information regarding a shape of the object, a horizontal boundary of the object, a size of the object, an orientation of the object, an upper surface curvature of the object, and a surface roughness of the object. Preferably, the control algorithm is arranged to control a gripping configuration of the plurality of gripping members in response to said plurality of inputs. Especially, the control algorithm may be arranged to control a tilting of the controllable gripper in response to a detected tilting of a surface of the object to be gripped. Especially, the control algorithm may be arranged to control a rotation of the controllable gripper relative to the controllable robotic actuator in response to a detected orientation of the object to be gripped.

Most preferably, said plurality of inputs comprises information regarding an upper surface of the object. This is especially preferred, in case the gripping members are suction cups. Especially, said information regarding an upper surface of the object comprises information regarding one or more of: location of areas with wrinkles, location of plane surface parts, an angle and orientation of tilting of the upper surface. Especially, the control algorithm may be arranged control the controllable robotic actuator and the controllable gripper to avoid placing a gripping member to engage with the object in an area with a wrinkle of the surface of the object. Especially, the control algorithm may be arranged control the controllable robotic actuator and the controllable gripper to place at least one gripping member in an area with a plane surface of the object. If the object is detected to have a rectangular shape, or at least a rectangular upper surface, the control algorithm is arranged to control the controllable robotic actuator and the controllable gripper so as to place a gripping member, e.g. suction cup, near at three or preferably all four corners of the upper surface of the object.

The control system is preferably arranged to provide said image of an object after being placed at the target position as a feedback to the control algorithm so as to improve the rate of success of picking and placing. Especially, the control algorithm may provide said feedback with respect to the processing of said plurality of inputs according to the predetermined algorithm to arrive at control parameters for controlling the controllable robotic actuator and the controllable gripper so as to grip the object. Especially, the control system may be arranged to process a plurality of said images of objects after being placed along with said plurality of inputs according to a learning algorithm, and to accordingly modify the control algorithm with respect to the processing of said plurality of inputs according to the predetermined algorithm to arrive at control parameters for controlling the controllable robotic actuator and the controllable gripper so as to grip the object.

In preferred embodiments, the control algorithm is arranged to select which one of the identified objects to grip according to an object selection algorithm being arranged to analyse said image, and extract a plurality of different parameters indicative of the plurality of objects identified, calculate a score value for each of the plurality of objects identified in response to said plurality of different parameters in accordance with a predetermined score algorithm, and compare said score values and select the object to grip in response to a result of said comparison.

Especially, the plurality of different parameters indicative of each of the plurality of objects identified comprises at least one of: a distance between the object and a current position of the gripper, a distance between the object and a target position where to place the object, a texture of an upper surface of the object, a curvature of an upper surface of the object, a tilting off an upper surface of the object, a height of an upper surface of the object compared to a height of surrounding objects, dimensions of the object, a type of the object, a shape of the object, and a quality of a part of said image covering the object. Specifically, the control algorithm may be arranged to assign, for each object, a parameter value for each of said plurality of different parameters according to a predetermined table, and wherein the control algorithm is arranged to calculate the overall score value for each object in response to the assigned parameter values. The object to grip is then selected as the object among the identified object which has the best overall score value.

The control system is preferably arranged to provide said image of an object after being placed at the target position as a feedback to the control algorithm with respect to the step of determining which object to grip among the plurality of objects identified. Especially, the control system may comprises a learning algorithm arranged to modify one or more parameters in said predetermined score algorithm, based on a plurality of images of the objects after being placed at the target position, so as to improve pick and place performance. The learning algorithm may specifically be arranged to modify one or more of said parameter values for each of said plurality of different parameters according to said predetermined table, so as to improve pick and place performance. Specifically, the learning algorithm may be arranged to modify one or more weighting factors in the predetermined score algorithm, so as to improve pick and place performance. The learning algorithm may comprise an Artificial Intelligence algorithm and/or a neural network or another type of machine learning algorithm.

In some embodiments, the robot system comprises a second sensor system, such as comprising a camera, placed on or above the pick and place robot, wherein the second sensor system is arranged to provide the image of objects at a gripping area. Especially, the control system is arranged to compare the image of objects at gripping area with the image of objects at the position upstream of the of the gripping area, and to detect if one or more objects have changed position relative to a surface of the feeding conveyor. This allows the robot to react, if one or more objects have moved, e.g. one object dropped down from the bulk, on the way from the position where the upstream image was provided to the gripping area of the robot. Thus, in some cases, the robot may need to change picking strategy, because the object selected to be picked based on the upstream image has become difficult or pick due to changes in the bulk. Thus, based on the new image, the control system may be arranged to select another object to be picked, based on the image of objects at the gripping area. In other cases only minor changes have occurred with the bulk of objects, e.g. the upper surface of the object to be gripped has changed angle compared to the position in the upstream image, and thus the control system can adapt the robotic actuator and gripper accordingly to grip the object, based on the image at the gripping area.

In some embodiments, the robot system comprises a plurality, such as 2-10, of pick and place robots arranged for being positioned along the feeding conveyor, each of the plurality of pick and place robots comprising a controllable gripper comprising a plurality of gripping members arranged to engage with a surface of the object to grip the object, wherein the plurality of gripping members are arranged in a controllable gripping configuration, and a controllable robotic actuator in a Cartesian or gantry configuration and being arranged to move the controllable gripper.

Such cascade of pick and place robots can provide a higher capacity compared to one single robot. Especially, the plurality of pick and place robots may be identical, each having a control system as well as separate sensors for providing an upstream image and possibly also a sensor to provide an image at the gripping area. However, the plurality of, or a part of, the plurality of pick and place robots may especially receive the same upstream image data. Specifically, this upstream image can then be compared with an image provided immediately upstream of each pick and place robot or group of robots, or compared with an image provided at the gripping area of each pick and place robot so as to identify any changes of the bulk of objects from the first upstream image of the bulk, and to act accordingly if any changes have occurred that may require a change in which object to pick and/or how to grip the object selected to be picked.

In a second aspect, the invention provides a sorter system comprising a conveyor, such as a conveyor arranged for continuously moving, arranged to transport objects of various shapes and sizes in bulk, a sorter arranged to receive objects, and a first robot system according to the first aspect, arranged to pick up an object from the conveyor and to place the object, e.g. singulated and oriented, on an induction to the sorter or directly on the sorter.

The first robot system may be arranged to place objects directly on the sorter upon the sorter moving at a constant speed, or on an induction to the sorter, e.g. an induction in the form of a conveyor band arranged to move an object onto the sorter in a direction perpendicular, or in another direction angle, to a moving direction of the sorter.

In some embodiments, the conveyor and the sorter are placed adjacent to each other, wherein the conveyor has a first side facing a first side of the sorter, and wherein the controllable robotic actuator comprises a gantry type or Cartesian type of robotic actuator positioned with a first support, e.g. on a floor, at a position to the second side of the conveyor and a second support, e.g. on the floor, at a position to the second side of the sorter. This configuration may allow the Cartesian or gantry type of robotic actuator to place the picked object on a target position directly on the sorter.

In some embodiments, a second robot system according to the first aspect is positioned downstream of the conveyor compared to the first robot system. This allows increased handling capacity. Further robot system(s) may be added downstream of the second robot system, to further increase capacity. Some of such plurality of robot systems may share components, e.g. sensor system and at least part of the control system.

In some embodiments, the sorter system comprises a plurality, such as 2-10, of pick and place robots arranged for being positioned along the feeding conveyor, each of the plurality of pick and place robots comprising a controllable gripper comprising a plurality of gripping members arranged to engage with a surface of the object to grip the object, wherein the plurality of gripping members are arranged in a controllable gripping configuration, and a controllable robotic actuator in a Cartesian or gantry configuration and being arranged to move the controllable gripper. Specifically, the pick and place robots may be arranged to place objects singulated on a second conveyor, e.g. a conveyor parallel with the feeding conveyor, wherein the second conveyor is arranged to transport objects to one or more inductions which are then arranged to load the objects onto the sorter.

In a third aspect, the invention provides use of the robot system according to the first aspect for handling objects comprising at least one of: mail pieces, parcels, baggage, items handled at a warehouse distribution, and items handled at a mail order distribution centre.

In a third aspect, the invention provides use of the sorter system according to the second aspect for handling objects comprising at least one of: mail pieces, parcels, baggage, items handled at a warehouse distribution, and items handled at a mail order distribution centre.

In a fourth aspect, the invention provides a method for picking an object from objects in bulk, and placing the object, e.g. singulated and/or oriented, at a target position on an induction to a sorter or directly on a sorter, the method comprising providing a robot comprising a controllable gripper comprising a plurality of gripping members arranged to engage with a surface of the object to grip the object, wherein the gripping members are arranged in a controllable gripping configuration, providing a controllable robotic actuator arranged to move the controllable gripper, providing an image of objects of the moving stream of objects upstream of a position of the robot, processing the image to identify objects therein, step a): selecting which one of the identified objects to grip, determining properties of the selected object in response to the image, step b) controlling the gripping configuration of the gripping members in response to said properties of the selected object, step c): controlling the controllable robotic actuator to move the controllable gripper to a position for gripping the selected object, controlling the controllable gripper to grip the selected object, controlling the controllable robotic actuator and the controllable gripper to move the object and releasing the object, e.g. singulated and/or oriented, at the target position, and providing an image of the object at the target position.

In some embodiments, the method comprises gripping the objects from a moving bulk of objects, e.g. a continuously moving stream of objects in bulk. In other embodiments, the method comprises gripping objects from a stationary bulk of objects, such as the robot emptying the stationary bulk of objects before receiving another bulk of objects.

In some embodiments, a sensor is providing information about a position of the object after being placed at the target position, e.g. by providing an image, e.g. a 2D or 3D photo at the target position after having placed the object. Especially, the method may further comprise feeding back said information about the position of the object after being placed to modify one or more of steps a), b) and c) in order to improve pick and place performance of the robot system. Especially, the method may comprise continuously applying a learning algorithm on incoming data regarding information about a position of the object after being placed at the target position. Especially, characteristics or features determined about the object from the image are used in the learning algorithm to modify one or more of steps a), b) and c) in order to improve pick and place performance of the robot system.

The individual aspects of the present invention may each be combined with any of the other aspects. These and other aspects of the invention will be apparent from the following description with reference to the described embodiments.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
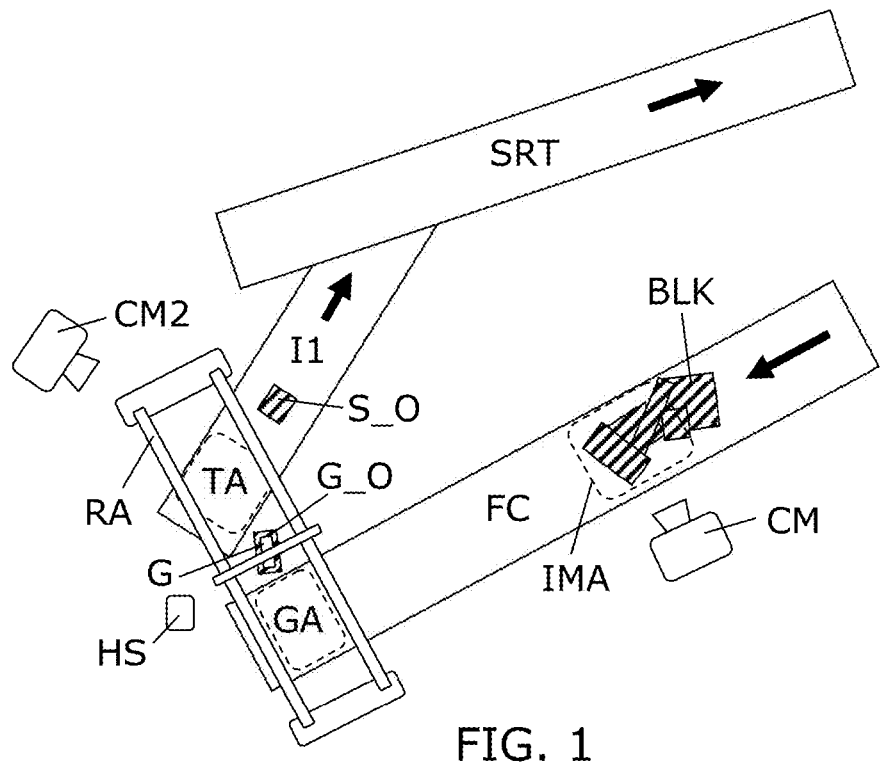
FIG. 1 illustrates a block diagram of a robot system embodiment.
Figure 2:
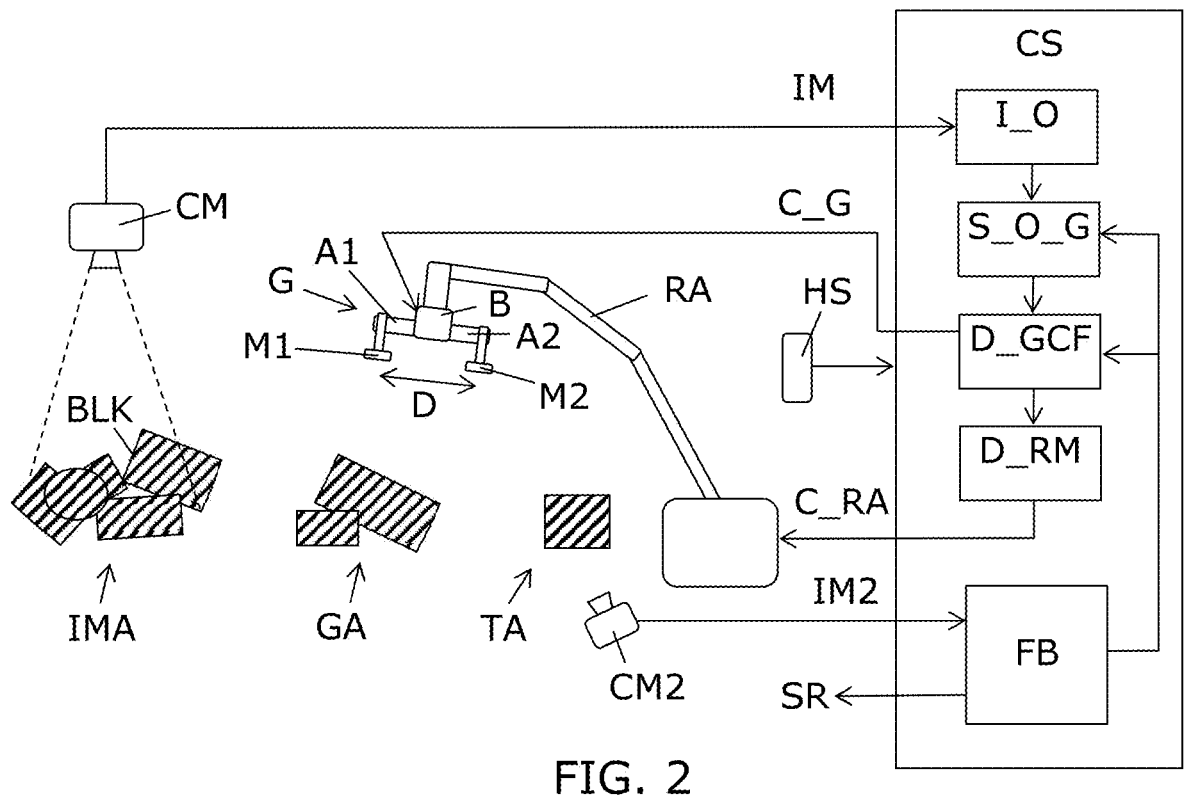
FIG. 2 illustrates a block diagram of another robot system embodiment.

FIG. 1 and FIG. 2 illustrate a robot system embodiment with a pick and place robot arranged to pick an object G_O from a continuously moving feeding conveyor FC transporting a stream of objects in bulk BLK, and to place the object S_O singulated at a target position TA on an induction I1 to a sorter SRT.

The robot system comprises a pick and place robot RA, G, and sensor system CM, CM2, and a control system CS with a processor system arranged to execute a control algorithm. The pick and place robot RA, G has a controllable robotic actuator RA serving to move a controllable gripper G for gripping objects. The embodiments of FIGS. 1 and 2 basically have the same elements but differ with respect to the level of details, and with respect to the robotic actuator RA, but in the following, both embodiments will be described as a whole.

In FIG. 1, the robotic actuator RA is a gantry type actuator, i.e. it has a fixed part with one set of elongated elements mounted on the ground in one end adjacent to the feeding conveyor FC and in the opposite end adjacent to the induction I1, so as to allow a movable part of the robotic actuator RA to move along the elongated elements to move a controllable gripper G between a gripping area GA where to pick up and object G_O on the feeding conveyor FC and to a target area TA on the induction I1. The robotic actuator RA has a movable part serving to move along the elongated elements by means of a controllable actuator, and the movable part further has a controllable actuator serving to move the gripper G perpendicular to the elongated elements, and a still further actuator serving to move the gripper G in a vertical direction. Thus, altogether the robotic actuator RA can move the gripper G to a position within a space covering the gripping area GA and the target position or target area TA. In FIG. 2 the robotic actuator RA is illustrated as a robotic manipulator arm comprising at least three joints or axes. The joints may be rotational joints or a combination of hinges and rotational joints. In preferred versions, the first robot comprises a base, wherein the manipulator arm extends from the base. Especially, the base may be mountable fixed to a floor or ground between the feeding conveyor FC and the sorter SRT. Preferably, the robotic manipulator arm has an extension making it capable of placing an item at a target area TA at least a horizontal distance of 1 meter away from the gripping area GA where it has picked up the item.

The controllable gripper G, seen in FIG. 2, has a plurality of gripping members M1, M2, of which two are visible. Preferably, the gripper G has four suction cups M1, M2, arranged to engage with a surface of the object G_O to grip upon application of a suction for or vacuum to the suction cups M1, M2. Suction cups have been found to be able to grip a larger variety of objects G_O irrespective of its surface texture, surface shape and orientation, such as ranging from small objects such as a piece of clothes only wrapped in a rather fluffy thin plastic bag, and up to large rectangular cardboard boxes with a weight of several kg. The suction cups M1, M2 of the controllable gripper G are arranged on adjustable arms A1, A2 mounted on a base part B. This allows a controllable gripping configuration of the suction cups M1, M2, in FIG. 2 illustrated as a variable distance D between the suction cups M1, M2. This controllable gripping configuration allows the geometry of the suction cups M1, M2 to be adaptable in response to the object G_O to grip. Thereby allowing the gripper G to adapt the distance D to match pick up of small as well as large items, and to further adapt the suction cup configuration to the most preferred way of placing the four suction cups M1, M2 on the object G_O for optimal grip. Optimal grip is important for the robot to allow handling of objects G_O at a high speed without loosing grip of the object G_O when being moved at a high acceleration rate towards the target position TA. A preferred gripper G is compact, thus allowing in the most compact configuration, i.e. with the lowest distance D of the suction cups M1, M2, to grip a small object placed between two higher objects, and yet allows the suction cups M1, M2 in the largest configuration to grip large objects, i.e. with the arms A1, A2 in their full length to provide the highest distance D between the suction cup. One preferred four suction cup gripper G will be described later.

The gripper G is preferably mounted to the robotic actuator RA so that it can rotate and tilt in relation to the position where it is mounted on the robotic actuator RA. This allows the gripper G to tilt and rotate to adapt to the orientation and tilting of an upper surface of any object in the bulk BLK for getting the most optimal grip on the object G_O.

The basic input to the pick and place robot RA, G, CS is a sensor system with a 3D camera CM mounted on a fixed position to provide a 3D image IM of an image area IMA upstream of the position of the pick and place robot RA, G. The image area IMA preferably covers the entire width of the feeding conveyor FC and at least a length to cover the expected longest objects in the bulk BLK stream of objects. One still photo IM may be taken at regular time intervals. The time interval is chosen to be at least small enough in relation to the selected image area IMA length and the speed of the feeding conveyor FC that all objects will be covered by an image IM. Depending on the chosen image processing, a series of images IM with high speed can be provided. The time interval for the images is preferably selected depending on the speed of the arriving stream of objects. However, it may be preferred that the images overlap, e.g. having an overlap of 20-80%, such as about 40-60%. In a specific embodiment, two or about two images per second are provided.

It has been found that such 3D image IM of incoming bulk objects BLK provides a sufficient input for precise control system CS of the pick and place robot RA, G without the need to have a camera or other sensor mounted on the moving part of the robotic actuator RA or gripper G. The image area IMA is preferably located at least a minimum distance upstream of the gripping area GA, depending on a number of parameters such as the speed of the incoming stream of objects, image processing time, and reaction time of the robotic actuator RA and gripper G. In a specific embodiments a distance of 0.5 m to 2.0 m may be preferred, e.g. 0.8 m to 1.5 m. The basic concept for control of the pick and place robot RA, G for picking up an object is that the provided image IM and a known speed of the feeding conveyor FC is sufficient to determine the exact time and location of the object to be gripped in the gripping area GA, and thus is used in the control system CS to determine control signals G_C, C_RA for controlling the gripper G and robotic actuator RA, respectively.

Various types of cameras CM exist, but preferably the CM is capable of providing a high quality 3D image allowing a precise identification of shapes to allow identification of separate objects in the bulk BLK, and also with a sufficient precise height dimension to allow precise navigation of the gripper G for gripping the object G_O selected for being gripped. The camera CM may especially be a 3D line camera, a Time of Flight type 3D camera, and a stereo 3D camera. Further, it is to be understood that a 2D camera may be used, where the height dimension of the 3D image IM is computed based on image processing of a 2D photo, or it may be obtained by an alternative technology, e.g. a separate height sensor placed separate from the camera CM.

A height sensor HS, e.g. a camera or other type of sensor, is placed to sense a height of a gripped object G_O. Since only an image IM taken from a position above the bulk BLK of objects is available, it may occur that a small object is gripped G_O from a position on top of a larger object. Thus, upon gripping, only the height of the surface of the upper object is known, and thus the actual height of the object gripped G_O is generally unknown. By the height sensor HS, the height of the gripped object G_O is sensed, and this information is used in the control of the gripper G and robotic actuator RA for placing the object G_O, or more specifically, to determine the height above the target area TA where to release the object G_O. This ensures that even fragile objects G_O can be handled without releasing the object G_O high above the target area TA, thus potentially damaging the object G_O or even misplacing the object G_O. The height sensor can be placed near the gripping area GA or near the target area TA, or between the gripping area GA and target area TA. The height sensor HS may be such as: a light bar array, a light beam sensor, or a camera.

The control system CS receives the 3D image IM and executes a control algorithm with a number of elements for generating control signals C_G, C_RA for control of the controllable gripper G and the robotic actuator RA, respectively. First, the 3D image is processed according to an object identification algorithm I_O to identify separate objects in the image IM of the incoming bulk BLK. Especially, this algorithm seeks to identify candidate objects for being picked by means of image processing techniques utilizing preferably the 3D information in the separation of single objects from the bulk BLK. At this stage, a number of parameters may be determined for each identified object to be used in the next step, image processing techniques, such as known in the art.

Next, based on the identified possible objects to be picked, a selection algorithm S_O_G is performed to select which object to be gripped next. The selection algorithm S_O_G is preferably based on analysis of the 3D image IM to extract a plurality of different parameters indicative of the plurality of objects identified to allow, based on the parameters, which object to grip based on a number of predetermined criteria or a balance of such criteria, e.g. an estimated speed of gripping the object to provide a high overall efficiency, and an estimated chance of success of gripping and placing the object. A non-exhaustive list of parameters that can be determined based on the image IM indicative of each of the plurality of identified objects are:

1) A distance between the object and a current position of the gripper G. This can be taken into account, since it takes time to move the gripper G, if the object is far away from the current position.
2) A distance between the object and a target position TA where to place the object. This is preferably considered in relation to 1), again with respect to the time required to move the gripper from the precise gripping location within the gripping area GA to the target position TA.
3) A texture of an upper surface of the object. This can be important, since the texture can significantly impact the rate of success of gripping the object, e.g. a smooth surface on the entire upper surface of the object may be preferred compared to a non-smooth texture. This depends on the type of gripping member, but a smooth texture is preferred for suction cup grippers.
4) A curvature of an upper surface of the object. This may also be important for the rate of success of gripping the object, since a curved upper surface may be difficult to grip, also for suction cup grippers.
5) A tilting of an upper surface of the object. This may be taken into account, e.g. if the upper surface tilts away from the current position of the gripper G, and/or because it may be considered that an object with a tilting upper surface is difficult to grip and in case of a box shaped object, the object may slide when gripped.
6) A height of an upper surface of the object compared to a height of surrounding objects. This can be important to evaluate if it is at all possible for the gripper G to enter the space for gripping the object in between two high objects, and at least a significant time may be required to do so.
7) Dimensions of the object. It may be preferred to either prioritize small or large objects for various reasons.
8) A type of the object. If the type of the object can be identified, it may be preferred to prioritize that object, or the opposite.
9) A shape of the object. It may prove to be preferred to prioritize specially shaped objects from others, e.g. box shaped objects may be preferred over round objects.
10) A quality of a part of said image IM covering the object. If for some reason a poor image quality is obtained for some objects, it may be disregarded to prioritize such object, e.g. this may be due to the object moving at the time the image IM is provided, which causes its exact position and orientation to be unknown at the gripping area GA.

Especially, the selection algorithm S_O_G to select which object to be gripped next may involve calculating a score value for each of the plurality of objects identified in response to the selected two or more of the parameters 1)-10) in accordance with a predetermined score algorithm which involves a balancing of the various parameters to obtain the desired efficiency versus rate of success balance. The score values determined for each of the objects is then compared, and the object to be gripped next is then selected as the object with the best score value.

After having selected the next object to grip, a control signal C_G is generated by an algorithm part D_GCF determining the gripping configuration of the plurality of gripping members M1, M2 based on properties of the selected object to be gripped, determined from the 3D image IM. These properties are preferably already determined, as explained above, in the object selection algorithm S_O_G. Especially, the shape and specifically the shape of the upper surface of the selected object is used to determine a control signal C_G to control an actuator in the gripper G to adjust length of the arms A1, A2 in order to determine a suitable distance D of the suction cups M1, M2. Especially, with a gripper G with four elongated arms A1, A2 mounted to the base part B, the four arms A1, A2 are controlled to provide a configuration of the four suction cups M1, M2 to form a gripping quadrangle size matching the shape and size of the upper surface of the object to grip. This may be determined based on a number of parameters so as to provide the best possible position of each of the suction cups M1, M2 on the upper surface of the object to grip based on various knowledge, such as to place the suction cups M1, M2 near corners of a plane rectangular surface. Especially, a non-exhaustive list of possible inputs to the algorithm D_GCF determining the gripping configuration are:

1) Information regarding a shape of the object.
2) A horizontal boundary of the object.
3) A size of the object.
4) An orientation of the object.
5) An upper surface curvature of the object.
6) A surface roughness of the object.

All of or some of the above inputs 1)-6) can be processed in the gripping configuration algorithm D_GCF to control the position of the arms A1, A2 of the gripper G to determine the configuration of the suction cups M1, M2 to best match the object to be gripped. The precise configuration, i.e. distance D between suction cups M1, M2 whether only two, or preferably four, can be designed to allow the best possible grip depending on the above parameters 1)-6), where the overall principle is to provide a gripping configuration which seeks to place suction cups M1, M2 towards the boundary of a plane surface, whether it may be selected to provide a smaller gripper configuration for a large object, if it has an irregular shape but has a well defined, but smaller, plane upper surface area which can be suitable for placing of all suction cups M1, M2 in spite the fact that this. For irregular objects, the selection of the preferred suction cup position and thus the gripping configuration will be a compromize. For the best grip by suction cups M1, M2 on a curved surface, a smaller gripping configuration may be preferred. For a small object, and assumingly also a light weight object, the gripping configuration may be chosen to best match the surface roughness, e.g. to avoid placing suction cups M1, M2 wrinkles of an object being a plastic foil covering a piece of clothes.

Especially, to save time, when the algorithm D_GCF has selected the gripper configuration to be used, the control system CS sends a control signal C_G to the actuator in the gripper G serving to actuate the arms A1, A2 to bring them A1, A2 into the determined position before or simultaneously with the robotic actuator RA moving the gripper G to the gripping area, so that the suction cups M1, M2 are already in the desired configuration for quickly gripping the object, when the gripper G reached the object and is rotated and tilted to the best match for gripping the object at the gripping area GA.

Next, after having decided about the gripping configuration of the gripper G, a robot movement control algorithm D_RM determines where to and how to control the robotic actuator RA to move the robotic actuator RA for positioning the gripper G to a position for gripping the selected object. This can be determined from some of the already mentioned parameters determined for the selected object, e.g. the above mentioned inputs 1)-6) for the algorithm D_GCF determining gripper configuration, such as tilting of the upper surface of the object. Further, taking into account the movement speed of the object in the transport direction of the feeding conveyor FC, it is calculated exactly where within the gripping area GA, in space, and exactly also when, the suction cups M1, M2 will be brought into contact with the surface of the object for gripping the object. The robot movement control algorithm D_RM then sends control signals C_RA for controlling movement of the robotic actuator RA including suitable control signals for actuators serving to tilt and rotate of the gripper G. The suction cups M1, M2 are then activated by controlling a vacuum system connected to the suction cups M1, M2 to apply suction to grip the object.

By keeping track of the orientation of the object, also based on the 3D image IM and the mentioned parameters already determined, the control system CS controls the controllable robotic actuator RA to move the gripper G and the object to a target position within the target area TA and to control tilting and rotation of the gripper G for releasing the object singulated at the target position, i.e. aligned with the direction of movement of the induction I1. Based on the input from the height sensor HS, the release height above the target area TA is determined, i.e. the height at which to release vacuum suction to the suction cups M1, M2.

In the illustrated embodiments in FIGS. 1 and 2, a second camera CM2 is setup to cover the target area TA in order to provide an image IM2 of an object after being released by the gripper G at the target position within the target area TA. This allows the image IM2 to be used as a feedback to a feedback algorithm FB in the control system CS, since it can be determined if an object was successfully placed at the target position by appropriate image processing, e.g. comparing the image IM2 with the initial image IM provided by the camera CM before picking, so as to determine if the object was successfully picked and placed as a suitably positioned and aligned object S_O. This can be used to calculate a rate of success SR of picking and placing objects. The rate of success SR can be output to a user indicating the rate of success SR as a percentage of successfully handled objects over a period of time. The rate of success SR can further be used by the control algorithm to detect a possible failure alarm, e.g. by calculating statistics based on the rate of success SR over time. If a sudden drop in rate of success SR is detected, there may be a fault in the system, and an alarm can be generated.

Furthermore, the feedback algorithm FB may use the image IM2 as input to a machine learning part of the feedback algorithm FB. Especially, the feedback algorithm FB may involve an Artificial Intelligence algorithm and/or a neural network based algorithm that may analyse some of the already mentioned inputs or parameters determined in the initial 3D image IM for the object. This can be used to annotate the resulting image IM2 after placing the object, in order for the learning algorithm to learn specific features of objects which are successfully handled, and features of objects which may prove to create difficulties in handling. With the purpose of gradually improving pick and place performance, the feedback algorithm FB may use machine learning to adapt the selection of object to grip algorithm S_O_G and the gripper configuration determining algorithm D_GCF based on the experienced pick and place fails and successes. This may be done on the robot system before bringing the robot into normal operation, however it may be preferred that the learning algorithm operates online with the robot system in normal operation. This will allow the robot system to be flexible and adapt gradually to improved performance e.g. if various parameters change, e.g. the rate of incoming objects in bulk BLK, the type of objects. This allows the robot system to flexibly adapt to a high performance even if the operating conditions change, such as handling of a new type of objects.

As an example, the learning algorithm part of the feedback algorithm FB may be capable of modifying one or more parameters in the above-mentioned score algorithm of the selection of object to grip algorithm S_O_G. Thus, based on a plurality of images IM2 of the objects after being placed at the target position TA, the selection of object to grip algorithm S_O_G can be adapted to provide an improved overall performance of the robot system. Specifically, the learning algorithm may modify weighting factors in the score algorithm, or provide feedback to an Artificial Intelligence system, so as to improve pick and place performance. Especially, some features or combination of features, may have proven to result in a so poor pick and place performance, that the selection of object to grip algorithm S_O_G may be designed to completely reject such object from picking, and to let the object instead continue on the feeding conveyor FC for manual handling.

As another example, the learning algorithm part of the feedback algorithm FB may be capable of modifying one or more parameters in the gripper configuration determining algorithm D_GCF. Specifically, the learning algorithm may modify one or more parameters in the processing of inputs used in the determination of the gripper configuration, such as determining the positioning of the suction cups M1, M2 in relation to a detected boundary of the object for a certain type of objects with special features or with a special combination of features.

The feedback algorithm FB may further be arranged to provide feedback to the object identification algorithm I_O, and to algorithm D_RM which determines movement of the robot, e.g. lowering the movement speed for moving certain gripped objects G_O which may have proven to be otherwise dropped.

Some embodiments comprises a second sensor systems, such as comprising a 2D or 3D camera, placed on or above the pick and place robot RA, G to provide an image of objects at the gripping area GA. This allows the control system CS to compare the image of objects at the gripping area GA with the image IM of objects at the position IMA upstream of the gripping area GA, and to detect if one or more objects have changed position relative to a surface of the feeding conveyor FC. E.g. an object may move, when one object G_O is being picked up by the gripper G at the gripping area GA, or an object may have moved, e.g. such object may have fallen from a top of a bulk of objects BLK on its way from the upstream position IMA to the gripping area. With this knowledge, the controller system CS may adjust the control of the pick and place robot RA, G accordingly. Further, the image of objects at the gripping area GA may also be used by the control system to detect any malfunction or any anomaly of function of the robots system, thus when the pick and place performance is evaluated to be outside what is expected as a normal function, e.g. if several objects in a row are placed away from the target position etc., the control system CS may generate an alarm signal to allow e.g. possible repair of the robot.

In some embodiments, a speed of the feeding conveyor FC may be controlled in at least two steps, such as between "stop" and "normal speed". Especially, a speed of the feeding conveyor FC may be controlled in a plurality of steps between "stop" and a maximum speed, such as 2-10 steps between "stop" and a maximum speed. It may be preferred to control the speed of the feeding conveyor FC in response to an estimate of expected pick and place handling capacity of the pick and place robot RA, G in relation to an incoming bulk of objects. A variable speed of the feeding conveyor FC allows the control system CS to ensure that the pick and place robot RA, G can handle a reasonable amount of arriving objects. Especially, the speed of the feeding conveyor FC may be controlled to allow the pick and place robot RA, G to handle all arriving objects BLK, or at least the feeding conveyor FC speed may be controlled so as to allow the pick and place robot RA, G to handle at least a predetermined fraction of incoming objects. Specifically, the be controlled in a "stop and go" manner, to allow the feeding conveyor FC to transport a bulk BLK of objects to the gripping area GA and then stop to allow the pick and place robot RA, G to pick and place a predetermined fraction of the bulk BLK of objects, e.g. all objects in the bulk BLK, before the feeding conveyor FC is controlled to "go" to allow another bulk BLK of objects to arrive to the gripping area GA for handling by the pick and place robot RA, G.

Alternatively, the speed of the feeding conveyor FC may be controlled between a plurality of speed steps gradually over time to ensure that the pick and place robot RA, G can handle a predetermined fraction of objects but without stopping the feeding conveyor FC. In some cases it may be acceptable for the pick and place robot RA, G to handle only a fraction of 5-50% of arriving objects, in case it is followed by one or more additional pick and place robot(s) downstream of the feeding conveyor FC, and/or followed by a manual handling station. In such cases, the speed of the feeding conveyor FC may be controlled by the control system CS to ensure a predetermined overall handling capacity of the pick and place system.

Specifically, the control system CS may be arranged to estimate a time required to complete a pick and place operation for one or more objects in a bulk BLK of objects before the bulk BLK of objects arrives at the gripping area GA. Such estimated time, e.g. taking into account identification of the one or more incoming objects as "easy", i.e. less time consuming, or "difficult", i.e. more time consuming, to handle which may be based on a machine learning and/or artificial intelligence input. The control system may then control the speed of the feeding conveyor FC so as to allow the pick and place robot RA, G to have time to handle the acceptable number of objects G_O to be gripped.

To increase pick and place efficiency, the control system CS may increase the speed of the feeding conveyor FC in case a space between two bulks BLK of objects is detected, so as to ensure that the idling time of the pick and place robot RA, G is reduced. By controlling the speed of the feeding conveyor FC, it is possible to optimize utilization of the pick and place robot as the robot actuator has a limited travel speed for moving the gripper. If objects arrive to the pick and place robot at an unfavourable position and time, the feeding conveyor FC speed can be controlled to provide a more optimal synchronization of the picking task of the robot to provide a higher utilization of the robot.

The sorter SRT may comprise a plurality of supporting surfaces arranged to move along a track in a transporting direction, wherein the supporting surfaces define empty spaces for receiving and transporting objects or items. However, it is to be understood that the sorter SRT may be of a type as for example: a tilt-tray sorter, a cross-belt sorter, a tote based sorter, a pusher sorter, a shoe sorter, or a pop-up sorter. Especially, the sorter SRT may be a closed loop type of sorter SRT. Especially, the sorter SRT may be arranged to transport objects or items with a speed of at least 0.4 m/s, such as 0.5-1.0 m/s, such as 1.0-1.5 m/s, such as 1.5-2.0 m/s, such as more than 2.0 m/s. Especially, the sorter SRT may be arranged to transport objects or items at a constant speed.

The sorter SRT may be part of a sorter system further comprising a plurality of discharges arranged for receiving items from the sorter SRT, wherein the discharges are arranged at different positions adjacent to the sorter SRT. The sorter system is thus arranged to discharge items from the sorter SRT at discharge locations selected in accordance with an identification code associated with the individual items. E.g. such identification code can be such as: a bar code, a postal code, an ID tag, RFID tag, or the like. By scanning the identification code of an item, the sorter system is capable of sorting the item accordingly.

The induction I1 may be arranged to receive an object or item S)O in one end and to accelerate the object or item so as to deliver the object or item in an empty space on the sorter SRT with a relative velocity to a velocity of the empty space on the sorter SRT, wherein said relative velocity is below a predetermined threshold.

Figure 3:
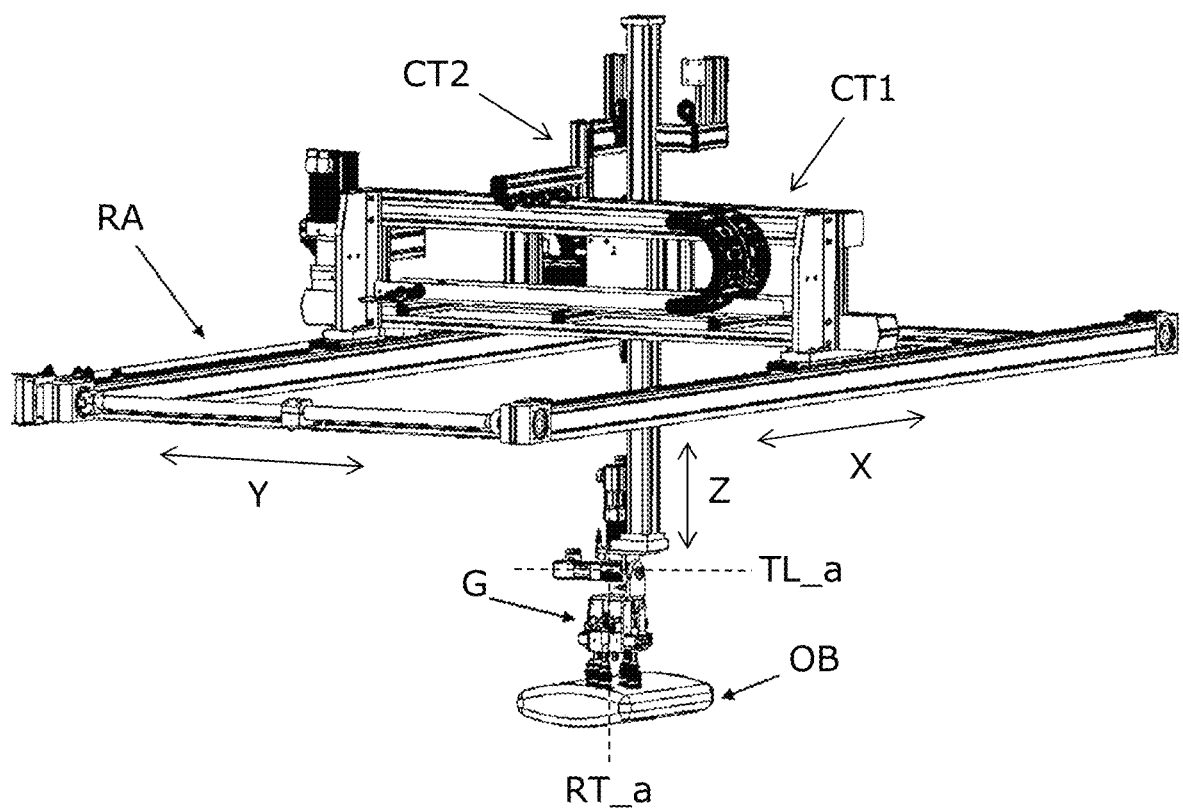
FIG. 3 illustrates a gantry type robot with a gripper with suction cups in an adjustable configuration.

FIG. 3 illustrates a preferred robotic actuator RA in the form of a gantry robotic actuator with an adjustable gripper G with four suction cups, here shown with a gripped object. A set of horizontal elements forming tracks for a controllably movable first cart CT1 arranged to be controllably actuated to move in a horizontal direction X. A controllably movable second cart CT2 arranged to be controllably actuated to move in another horizontal direction Y on tracks of the first cart CT1.

The gripper G is mounted on a member fixed to the second cart CT2 and is controllably movable in a vertical direction Z to allow height adjustment of the gripper G. The gripper G is shown mounted on this member by a controllable actuator element which allows controllable rotation around a vertical rotation axis RT_a. Further, the gripper is mounted on the member by a controllable actuator element which allows controllable tilting around a horizontal tilting axis TL_a.

The dimension of the various elements of the robotic actuator RA can easily be adapted to the required X, Y, Z distance capacity required for the pick and place robot, and also the strength of the various elements can be adapted for the load of objects to be handled. Various types of actuators for the X, Y, Z direction actuation can be used, as known in the art of gantry type of robots.

Figure 4A:
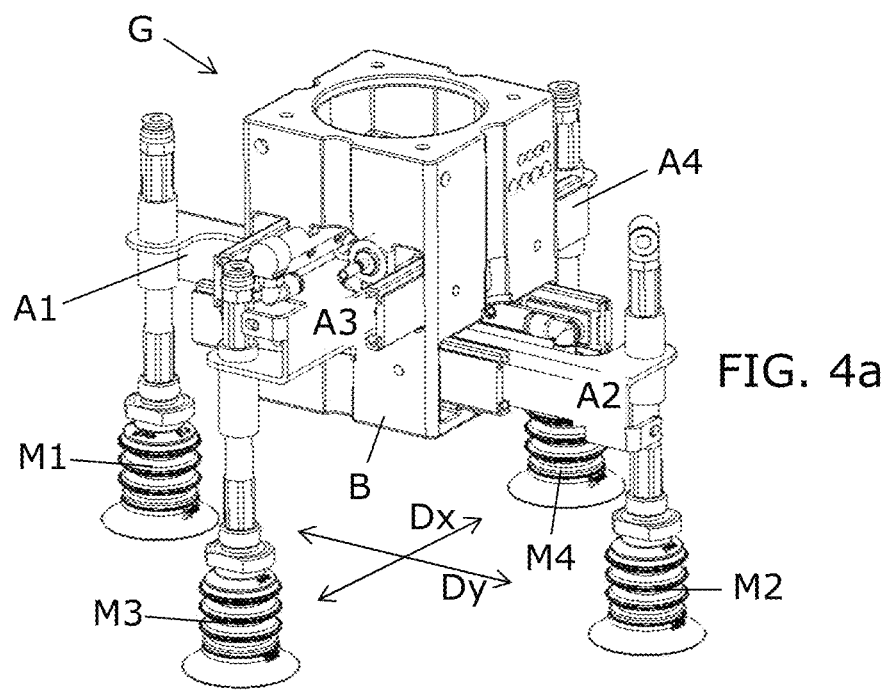
FIGS. 4a and 4b illustrates a preferred gripper with an adjustable gripper configuration and a rotation and tilting mechanism to allow the gripper to be used with a Cartesian or gantry type robotic actuator.
Figure 4B:
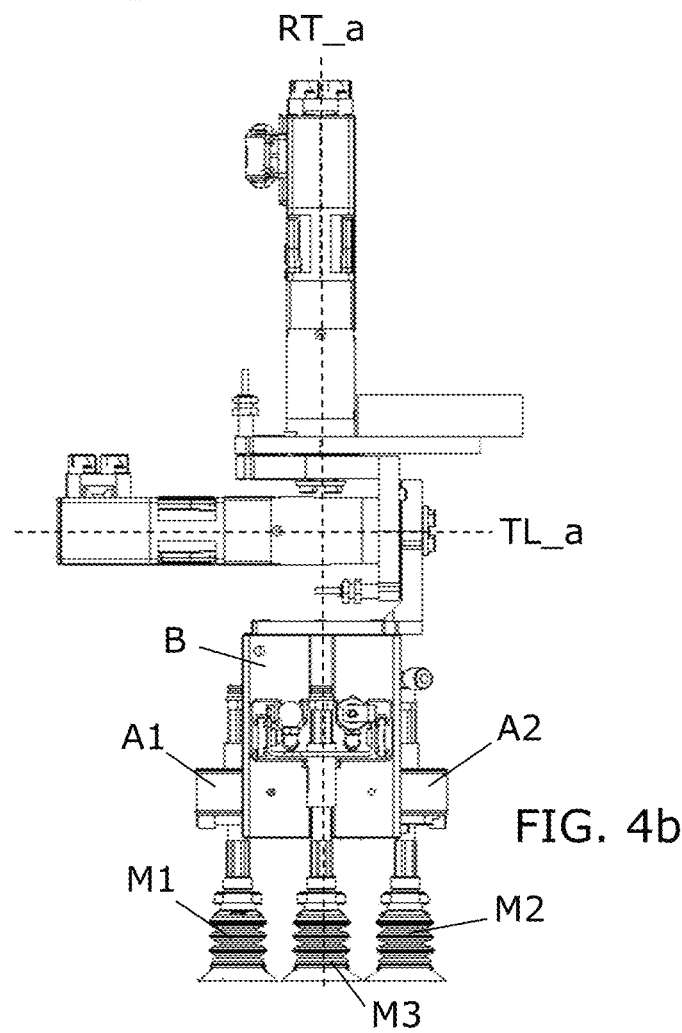

FIGS. 4a and 4b illustrates two views of a preferred gripper G embodiment with a controllable gripping configuration of four gripping members in the form of suction cups M1, M2, M3, M4. In FIG. 4a, the gripper G is shown in the fully extended gripper configuration, i.e. with the suction cups M1, M2, M3, M4 at maximum distance from each other, thus suited for gripping large objects. In FIG. 4b, the gripper is in its fully compressed gripper configuration, i.e. with the suction cups M1, M2, M3, M4 with minimum distance from each other, thus suited for gripping small objects.

A base part B serves for mounting on the robotic actuator, by means of a controllable tilting element for tiling around a tilting axis TL_a, and by means of a controllable rotation element for rotating around a rotation axis RT_a (also seen in FIG. 3). The suction cups M1, M2, M3, M4 are mounted near distal ends of respective elongated arms A1, A2, A3, A4 which are mounted to the base part B. Each arm A1, A2, A3, A4 is slidably arranged along its length relative to the base part B actuated by a controllable actuator. This allows the arm A1, A2, A3, A4 to be controllably adjusted with respect to a position of suction cups M1, M2, M3, M4 relative to the base part B. The suction cups are aligned with their suction contacts form a plane, and wherein the arms A1, A2, A3, A4 are slidably arranged to move along axes Dx, Dy which are parallel to this plane.

Especially, it is seen that arms A1 and A2 are slidably arranged along the same axis Dx, and part of the arms are arranged to slide inside each other. Arms A3, A4 are likewise arranged to slide inside each other, so as to be slidably arranged along axis Dy. Thus, the four arms A1, A2, A3, A4 are arranged to extend in four different directions in one plane, perpendicular to each other. Depending on the chosen type of actuation, all four arms A1, A2, A3, A4 can be actuated separately to allow a high degree of flexibility with respect to gripping configuration, but requiring separate actuators, or the arms A1, A2, A3, A4 can be actuated together, e.g. in pairs. Alternatively, two actuators can be used to actuate the arms A1, A2, A3, A4 in two pairs A1, A2, and A3, A4, and further one single actuator can be used to actuate all four arms A1, A2, A3, A4, thus allowing only limited variation in the gripping configuration. It may be preferred that the actuator(s) e.g. electric motor(s), for the arms is/are mounted above the tiling and rotation points, to allow reduction of weight of the gripper G. In an embodiment, a rotation cable may transfer rotation power from the motor(s) to actuate the arms A1, A2, A3, A4 by means of a gear mechanism inside the base part B. In case of individually adjustable lengths of all four arms A1, A2, A3, A4, various gripping configuration shapes can be made to fit optimal grips for irregular objects.

Such gripper G is flexible and yet compact, since even with a compact base part B, a highly flexible gripping configuration is achieved: from a very compressed and compact configuration occupying a minimum of space outside the dimension of the base part B itself, and to a fully extended gripping configuration which can be used for handling large objects. The gripper G can handle large objects at one point in time, and shortly after, it can be controlled to provide a compressed state gripping configuration to enable the gripper G to enter the space between two large objects for gripping a small object. This allows a high flexibility in the handling of bulk objects.

Figure 5A:
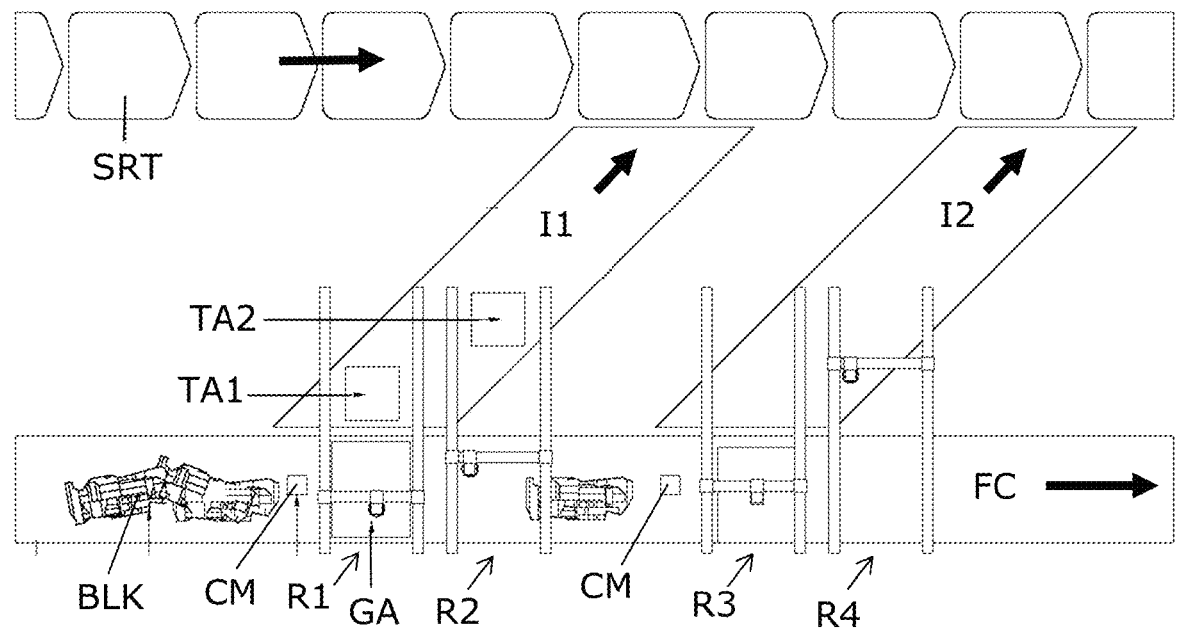
FIG. 5a illustrates an example of a series of robots cooperating to pick objects from a feeding conveyor and place objects onto inductions to a sorter.
Figure 5B:
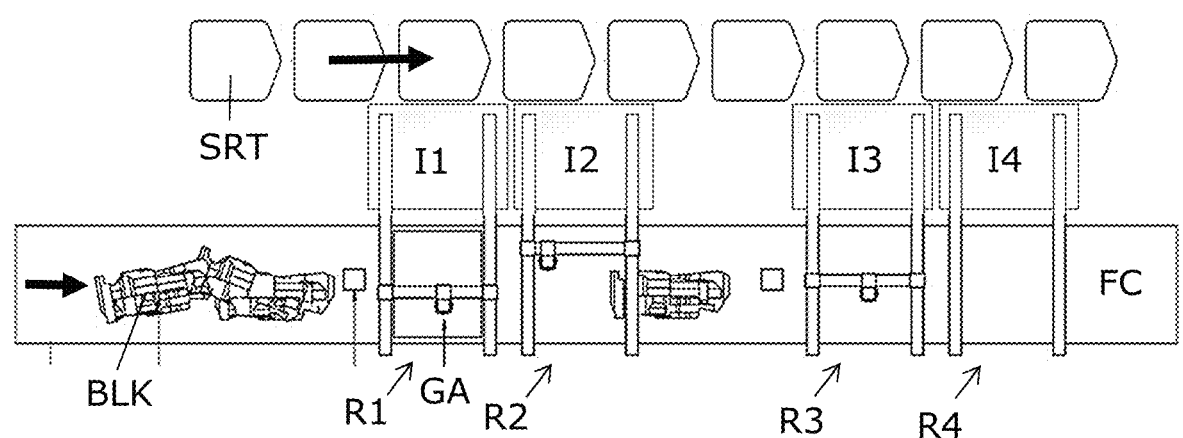
FIG. 5b illustrates another example of a series of robots cooperating to pick objects from a feeding conveyor and place objects onto simple bands for induction to a sorter.
Figure 5C:
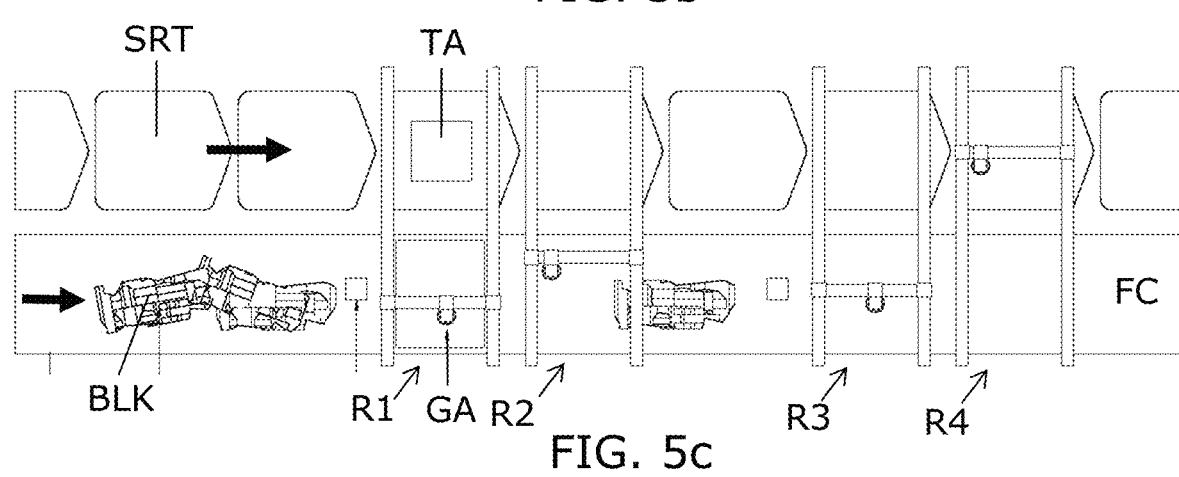
FIG. 5c illustrates an example of a series of robot cooperating to pick objects from a feeding conveyor and placing objects directly on a sorter.

FIGS. 5a-5c illustrate various systems of pick and place robots R1, R2, R3, R4 cooperating in picking objects from a bulk of objects BLK transported on a feeding conveyor FC, and placing objects on an induction I1, I2, I3, I4 or directly on an empty place on a sorter SRT moving at constant speed. The use of more than one pick and place robot is required, if the capacity of one single pick and place robot is insufficient to handle all incoming objects BLK. To solve this problem, a number of pick and place robots R1, R2, R3, R4 as already described can be placed downstream of each other. Thus, objects that have not been picked by the first robot R1 are taken as input to the next robot R2 in line. In case of special objects or in case of a peak in incoming objects BLK which can not be handled even by the last robot in R4 in line, a manual pick and place process at a position downstream of the last robot R4 in line may be possible.

FIG. 5a shows a system with four robots R1, R2, R3, R4 arranged in sets of two R1, R2, and R3, R4. The first set of gantry type robots R1, R2 cooperate to place objects on a first induction I1 to the sorter SRT, while the second set of gantry type robots R3, R4 cooperate to place objects on a second induction I2 to the sorter SRT. The first set of robots R1, R2 share one 3D camera CM to provide input of objects BLK, and the control system for the first set of robots R1, R2 may already determine which objects to be handled by the respective robots R1, R2, or these robots R1, R2 may have separate control systems, but have the possibility to share a camera CM for providing 3D image input. One robot R1 picks objects from one a gripping area GA on the feeding conveyor FC and placed objects on one target area TA1 on the first induction I1, while the second robot R2 picks objects from another gripping area on the feeding conveyor FC and placed objects on another target area TA2 on the first induction I1. In a similar manner, the second set of robots R3, R4 cooperate to pick up objects left on the feeding conveyor FC by the first set of robots R1, R2, and placing objects on respective target positions on the second induction I2.

FIG. 5b illustrates a system with four gantry type robots R1, R2, R3, R4 arranged in sets of two R1, R2, and R3, R4. The first set of robots R1, R2 cooperate to pick and place objects based on one common 3D camera input, as in FIG. 5a, but the robots R1, R2 places objects on respective simple conveyor band inductions I1, I2 which bring the objects perpendicular to an empty place on the sorter SRT. In a similar manner, the second set of robots R3, R4 cooperate to place objects on respective simple conveyor band inductions I3, I4. Thus, in contrast to the configuration in FIG. 5a, there will be no conflict between the robots in one set of cooperating robots R1, R2 in the placing of objects on the same induction, rather in FIG. 5b all four robots R1, R2, R3, R4 pick objects on respective non-overlapping gripping areas on the feeding conveyor FC and place objects on respective target areas on separate inductions I1, I2, I3, I4.

FIG. 5c illustrates yet another system with four gantry type robots R1, R2, R3, R4 arranged in sets of two R1, R2, and R3, R4 to cooperate in picking up objects from one feeding conveyor FC as described in FIGS. 5a and 5b. However, in FIG. 5c, each robot R1, R2, R3, R4 is arranged to grip objects on a gripping area GA on the feeding conveyor FC and placing the objects on a target area TA being an empty place directly on the sorter SRT. In the shown embodiment, the sorter SRT and the feeding conveyor FC are positioned adjacent to each other in parallel and moving in the same direction (bold arrows), at the same or at different speeds. The gantry type robots R1, R2, R3, R4 are mounted, on one side, next to the sorter SRT, and on the opposite side, next to the feeding conveyor FC. E.g. the robots R1, R2, R3, R4 may be mounted on the ground or onto another support. In the shown embodiment, the gantry type robots R1, R2, R3, R4 are arranged with their main axes being perpendicular to the sorter moving direction SRT and feeding conveyor FC moving direction. However, in other configurations, the gantry type robots R1, R2, R3, R4 are setup to provide another angle between their main axes and the moving directions of either or both of the feeding conveyor FC and the sorter SRT.

The setup in FIG. 5c eliminates the need for inductions which occupy space, and which add extra complexity to the sorting system. However, the control systems of the pick and place robots R1, R2, R3, R4 need to coordinate on which empty places on the sorter SRT to place objects. Further, the control system is preferably arranged to calculate if the robot R1, R2, R3, R4 has sufficient time to reach the position of the empty space on the sorter SRT and deliver the object at a relative velocity to the sorter velocity being close to zero, or at least with a relative speed close to zero.

Figure 6:
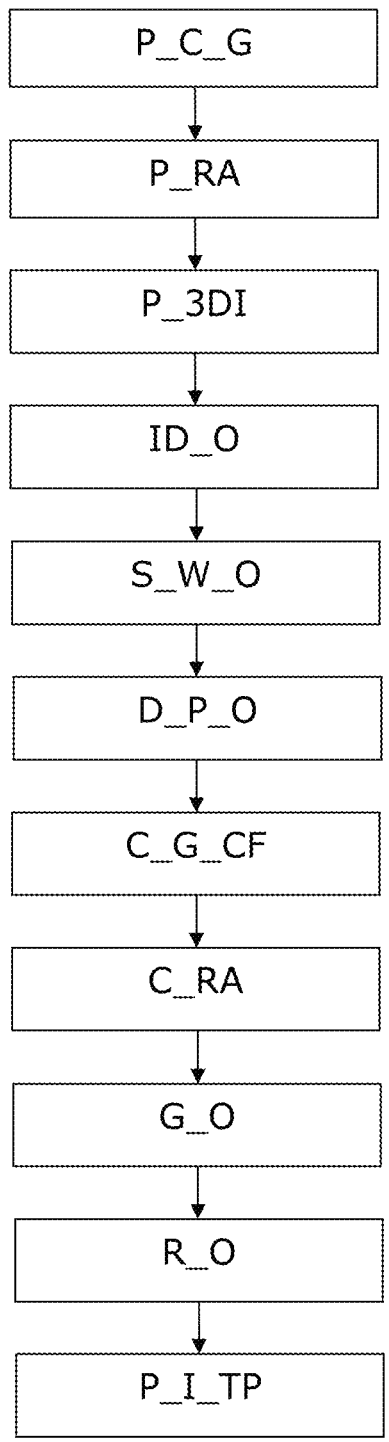
FIG. 6 illustrates steps of a method embodiment.

FIG. 6 illustrates steps of a method embodiment for picking an object from a continuously moving stream of objects in bulk, and placing the object singulated at a target position on an induction to a sorter or directly on a sorter. The method comprises providing P_C_G a controllable gripper comprising a plurality of gripping members arranged to engage with a surface of the object to grip the object, wherein the gripping members are arranged in a controllable gripping configuration. Further, providing P_RA a controllable robotic actuator arranged to move the controllable gripper. Further, providing P_3DI a 3D image of objects of the moving stream of objects upstream of a position of the controllable robotic actuator. Next, processing ID_O the 3D image to identify objects therein to be possibly picked. Next, selecting S_W_O which one of the identified objects to grip. Next, determining D_P_O properties of the selected object in response to the 3D image by means of image processing techniques. E.g. the step D_P_O may be determined before step S_W_O and also before step ID_O. Next, controlling C_G_CF the gripping configuration of the gripping members in response to said properties of the selected object. Next, controlling C_RA the controllable robotic actuator to move the controllable gripper to a position for gripping the selected object. Next, controlling G_O the controllable gripper to grip the selected object, e.g. by applying a vacuum in case of the gripping members to be suction cups. Finally, controlling R_O the controllable robotic actuator and the controllable gripper to move the object and releasing the object singulated and aligned at the target position on the induction to the sorter or directly on the sorter. After releasing the objects, providing P_I_TP an image of the object at the target position, e.g. by a 2D or 3D camera.

Further steps may comprise providing an image of the target position to determine if and how a handled object was successfully placed at the target position. A machine learning algorithm may provide this image as input to continuously improve the performance of the robot system by modifying parameters of one or more of the steps ID_O, S_W_O and C_G_CF.

It is to be understood that in principle, all types of objects or items can be handled by the described robot systems. I.e. objects or items can be of various shapes, sizes, and with various surface characteristics. Especially, the stream of objects or items arriving at the feeding conveyor FC may comprise at least one of: mail pieces, parcels, baggage, items handled at a warehouse distribution, and items handled at a mail order distribution centre, such as shoes, clothes, textiles etc. Especially, the robot system is designed for handling objects or items which have a maximum weight of 1-100 kg, such as 1-10 kg, such as a maximum weight of 2-3 kg. Especially, objects or items with a maximum weight of 2-3 kg can be picked up and moved at a high speed even with moderately sized robots. It is to be understood that the robot system can alternatively be designed for handling heavier objects than 100 kg.

It is understood that the function of control system is preferably implemented by a processor system. The processor may be a computerized controller including a digital processor executing the control algorithm which is implemented in software, so as to allow easy updating and adaptation of the function of the system, e.g. by changes in sorter and induction configuration, and by including more robots to the system which need to be controlled in order to most effectively cooperate to handle the incoming stream of objects or items.

In some embodiments, the control system can be implemented by means of a Programmable Logic Controller (PLC). The processor may be a dedicated robot controlling processor, or it may be implemented as part of or sharing the processor serving to control the sorter. Hereby, the addition of one or more robots to an existing sorter system may be implemented with a minimum of extra hardware for controlling the robot(s), and thus in such implementations, the program code for controlling the robot(s) can be implemented purely as processor executable program code. Likewise, the processor may be implemented as part of or sharing the processor serving to control the one or more induction for transporting items to the sorter. Still further, the processor may be implemented as part of or sharing the processor serving to control the feeding conveyor, which may be advantageous in case the robot(s) are intended to singulate items arriving at the feeding conveyor prior to picking up the items for placing on the induction(s) or the sorter. Yet other versions may have separate robot controls with interfaces to one common machine controller for controlling sorter, inductions and feeding conveyor(s). The machine controller may then have an interface to an overall system controller, which may have an interface to an ever higher order control, e.g. a Warehouse Management System (WMS).

The control system can be performed with many of its functions implemented as computer program code, and in practice the program code may be partly or fully integrated with existing systems for controlling a sorter and induction system based on manual picking and moving from a feeding conveyor to an induction. However, it may be preferred that the control system has two or more separate processors, e.g. a separate processor serving to perform at least some of the required image processing on the 3D images.

Embodiments of the robot system have been tested, and it has obtained a capacity of up to 1,500-2,000 handled objects per hour with a rate of 100% successful picking and placing, where a bulk of randomly shaped, sized, and textured objects arrive at a feeding conveyor at a speed of 0.1-1.0 m/s. In certain versions, a throughput of more than 2,000 objects per hour may be obtained.

Figure 7:
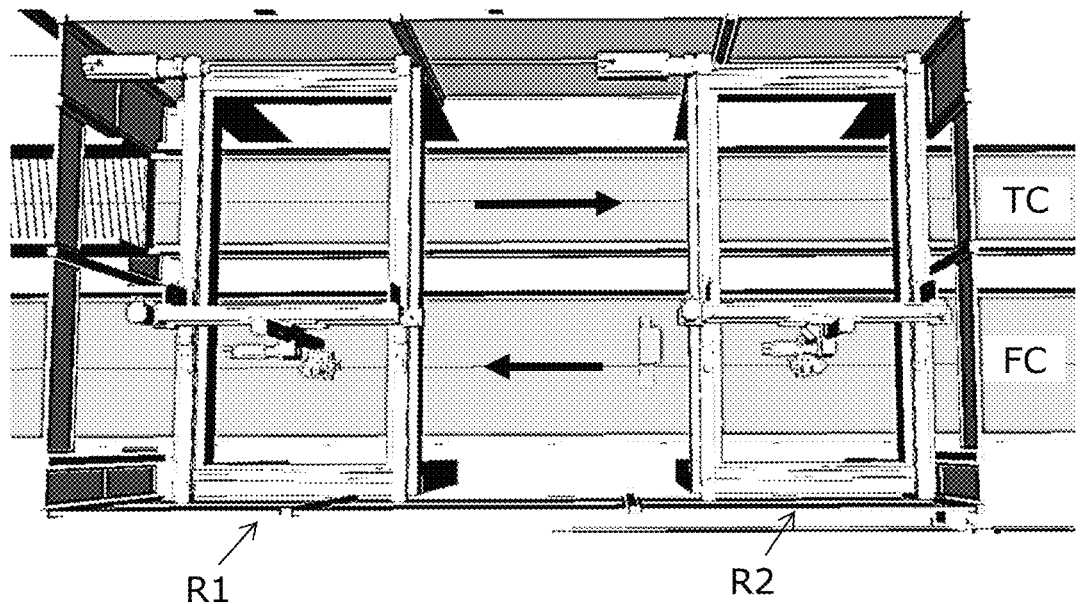
FIG. 7 illustrates an example of a series of robots sorting from a common feeding conveyor onto a common target conveyor.

FIG. 7 illustrates an example of a multi pick and place robot system, here illustrated as two robots in gantry configurations R1, R2 arranged along a feeding conveyor FC and being arranged to pick objects from respective gripping areas on the feeding conveyor FC and place objects on a target conveyor TC cooperating so that they place objects singulated and spaced apart on the target conveyor TC. The target conveyor TC transports the singulated and spaced apart objects to an induction system (not shown) serving to automatically induct the objects to a sorter. Thus, the pick and place robots R1, R2 indirectly provide objects to induction(s) to the sorter, and the primary task of the pick and place robots R1, R2 is to singulate the objects space apart and preferably also oriented on the target conveyor TC.

The robots R1, R2 may be as described in the foregoing with grippers being arranged to rotate and tilt and with four suction cups in a controllable configuration to adapt to the shape and size of arriving objects. The robots R1, R2 may share one single upstream image system, or the robots R1, R2 may have separate upstream image systems to provide an image of the bulk of objects actually arriving upstream of each robot R1, R2. Preferably, each of the robots R1, R2 is arranged to individually identify objects arriving in bulk and to determine which object to pick from the 3D bulk of arriving objects. The individual robots R1, R2 may also have separate image systems arranged to provide images of objects after being placed on the target position on the target conveyor.

In the illustrated example, the feeding conveyor FC and the target conveyor TC are arranged parallel to each other and arranged to transport objects in opposite directions (indicated by black arrows).

Figure 8:
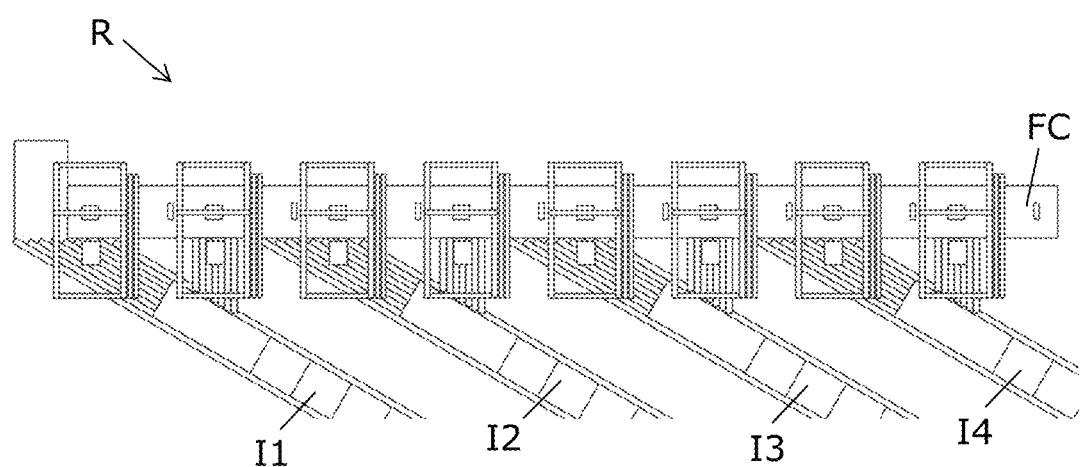
FIG. 8 illustrates an example of a series of robots sorting from a common feeding conveyor onto multiple target conveyors.

FIG. 8 illustrates another multi pick and place robot system example. Here, 8 gantry type pick and place robots R are arranged along a common feeding conveyor FC and being arranged to pick objects from respective gripping areas on the feeding conveyor FC and pairwise place objects singulated on 4 parallel inductions I1, I2, I3, I4 which transport and induct the objects on a sorter (not shown). As in FIG. 7, the 8 robots may be as described in the foregoing with grippers being arranged to rotate and tilt and with four suction cups in a controllable configuration to adapt to the shape and size of arriving objects. The 8 robots may share one single upstream image system, or the 8 robots may have separate upstream image systems to provide an image of the bulk of objects actually arriving upstream of each robot.

To sum up: the invention provides a robot system for picking randomly shaped and sized object from a continuously moving stream of objects in bulk, e.g. a 3D bulk, and placing the object singulated and aligned on an induction or directly on a sorter. A pick and place robot has a robotic actuator for moving a gripper with a controllable gripping configuration of its gripping members, e.g. four suction cups, to adapt the gripper for various objects. A control system processes a 3D image of objects upstream of a position of the pick and place robot, identifies separate objects in the 3D image, and selects which object to grip, based on parameters of the identified separate objects determined from the 3D image. Based on e.g. size and shape of the selected object to grip, the gripping configuration of the gripper is adjusted to match the surface of the object to grip for optimal gripping. The robotic actuator, e.g. a gantry type robotic actuator, is then controlled to move the gripper to a position for gripping the object, and afterwards move the gripper with the gripped object to a target position and with a target orientation to release grip of the object and thus place the object on an induction or directly on a sorter. An image after placing the object along with properties of the object determined from the 3D image can be used as input to a machine learning for online improving pick and place performance of the robot system, e.g. for online improving the algorithm for selection of which object to pick, and also for selection of the appropriate gripping configuration to match the object.

A number of embodiments will be described in the following.

E1. A robot system arranged to pick an object from objects in bulk, and to place the object at a target position on an induction to a sorter or directly on a sorter, the system comprising
    a pick and place robot comprising
        a controllable gripper comprising a plurality of gripping members arranged to engage with a surface of the object to grip the object, wherein the plurality of gripping members are arranged in a controllable gripping configuration, and
        a controllable robotic actuator arranged to move the controllable gripper,
    a sensor system arranged to provide an image of objects upstream of a position of the pick and place robot, and
    a control system arranged to receive said image and to execute a control algorithm arranged to
        identify objects in response to said image,
        select which one of the identified objects to grip,
        control the gripping configuration of the plurality of gripping members in response to properties of the selected object determined from said image,
        control the controllable robotic actuator to move the controllable gripper to a position for gripping the selected object, and control the controllable gripper to grip the selected object, and
        control the controllable robotic actuator and the controllable gripper to move the object and to release the object at the target position.

E2. The robot system according to E1, wherein the controllable robotic actuator comprises a Cartesian type of robot actuator, such as a gantry type of robotic actuator.

E3. The robot system according to E1 or E2, wherein the controllable robotic actuator is arranged to accelerate the object in a direction of a continuously moving sorter, after the object has been picked up, and to place the object singulated at a target position directly on the sorter at a velocity of the sorter, or approximately at the velocity of the sorter.

E4. The robot system according to any of E1-E3, wherein the sensor system is arranged to provide still images covering a fixed area upstream of the position of the pick and place robot and at a distance of the pick and place robot.

E5. The robot system according to any of E1-E4, wherein the sensor system is arranged to provide a 3D image.

E6. The robot system according to any of E1-E5, wherein the sensor system comprises a camera system placed at a fixed position above the moving stream of objects.

E7. The robot system according to any E1-E6, comprising a sensor arranged to sense a height of the object after it has been picked up by the controllable gripper, wherein the control system is connected to said sensor and to receive information indicative of the height of the object, and wherein the control system is arranged to control release grip of the object at a height above the target position in response to said information indicative of the height of the object.

E8. The robot system according to any of E1-E7, comprising a sensor arranged to provide an image of an object after being placed at the target position.

E9. The robot system according to E8, wherein the control system is arranged to compare the image of the object after being placed at the target position with the object in the image of objects provided by the sensor system.

E10. The robot system according to E9, wherein the control system is arranged to process said image of the object after being placed at the target position, so as to determine at least position of the object relative to the target position, and wherein the control system is arranged to compare at least position of the object relative to the target position and to determine if the position of the object deviates from the target position by more than a predetermined threshold value.

E11. The robot system according to E9 or E10, wherein the control system is arranged to generate an output in response to said comparison between the image of the object after being placed at the target position with the object in the image of objects provided by the sensor system.

E12. The robot system according to any of E9-E11, wherein the control system is arranged to provide an output indicative of a pick and place performance of the robot system in response to images of a plurality of objects after being placed at the target position.

E13. The robot system according to any of E9-E12, wherein the control system is arranged to provide said image of an object after being placed at the target position as a feedback to the control algorithm.

E14. The robot system according to E13, wherein the control system comprises a learning algorithm arranged to learn characteristics in the image of objects which have a high or low rate of success of being placed at the target position, based on a plurality of images of the objects after being placed at the target position.

E15. The robot system according to claim E14, wherein the control system is arranged to select which object of the identified objects to grip in response to said learning algorithm.

E16. The robot system according to E14 or E15, wherein said characteristics comprises one or more of: orientation, dimensions, and type identification.

E17. The robot system according to any of E14-E16, wherein the control algorithm comprises at least one algorithm part involving an artificial intelligence algorithm and/or a neural network algorithm for processing images of objects after being placed at the target position, so as to train one or more parts of the control algorithm to improve pick and place performance of the robot system.

E18. The robot system according to any of the preceding claims, wherein the controllable gripper comprises
  a base part arranged for mounting on the robotic actuator,
  at least two arms mounted to the base part, wherein each arm
    has a gripping member arranged at or near a distal end of the arm, wherein the gripping member is arranged for engaging with the object for gripping the object, and
    is slidably arranged along its length relative to the base part actuated by a controllable actuator, so as to allow the arm to be controllably adjusted with respect to a position of the gripping member relative to the base part, and
  wherein the at least two arms are slidably arranged in different directions relative to the base part, so as to allow the gripping members to form various gripping configurations with respect to at least size.

E19. The robot system according to according to E18, comprising four elongated arms mounted to the base part, wherein the four arms are slidably arranged in different directions relative to the base part, so as to allow the four gripping members to form various gripping quadrangle sizes.

E20. The robot system according to E18 or E19, wherein the control algorithm is arranged to control separate controllable actuators for each of the plurality of arms of the controllable gripper to grip the selected object in response to said image.

E21. The robot system according to E18 or E19, wherein the control algorithm is arranged to control one single controllable actuator for actuating the plurality of arms of the controllable gripper to grip the selected object in response to said image.

E22. The robot system according to E18 or E19, wherein the control algorithm is arranged to control at least two controllable actuators for control of the plurality of arms of the controllable gripper to grip the selected object in response to said image.

E23. The robot system according to any of E18-22, wherein each arm has a suction cup mounted on or near its distal end.

E24. The robot system according to E23, comprising a controllable vacuum system connected to apply vacuum to the suction cups, and wherein the control system is arranged to control the controllable vacuum system so as to control when to apply vacuum to the suction cups for gripping the object, and so as to control when to interrupt vacuum for releasing the object.

E25. The robot system according to any of E18-E24, wherein the base part is mounted to the robotic via a controllable rotation element to allow the base part to perform a controllable rotation around a rotation axis, and wherein the base part is further mounted to the robotic actuator via a controllable tilting element to allow the base part to perform a controllable tilt around a tilting axis.

E26. The robot system according to any of claims E18-E25, wherein the control system is arranged to control the controllable gripper to cause the gripping members to form a predetermined gripping configuration, in order to prepare for gripping the object.

E27. The robot system according to any of E1-E26, wherein the control algorithm of the control system is arranged to control the controllable robotic actuator and the controllable gripper to grip a selected object to be picked in response to a plurality of inputs determined from said image, wherein said plurality of inputs comprises at least one of: information regarding a shape of the object, a horizontal boundary of the object, a size of the object, an orientation of the object, an upper surface curvature of the object, and a surface roughness of the object, wherein the control algorithm processes the plurality of inputs according to a predetermined algorithm to arrive at control parameters for controlling the controllable robotic actuator and the controllable gripper so as to grip the object.

E28. The robot system according to E27, wherein the control algorithm is arranged to control a gripping configuration of the plurality of gripping members in response to said plurality of inputs.

E29. The robot system according to E27 or E28, wherein the control algorithm is arranged to control a tilting and a rotation of the controllable gripper in response to a detected tilting and rotation of the object to be gripped.

E30. The robot system according to E27-E29, wherein said plurality of inputs comprises information regarding an upper surface of the object regarding one or more of: location of areas with wrinkles, location of plane surface parts, an angle and orientation of tilting of the upper surface.

E31. The robot system according to E30, wherein the control algorithm is arranged control the controllable robotic actuator and the controllable gripper to place at least one gripping member in an area with a plane surface of the object.

E32. The robot system according to any of claims E27-E31, wherein the control algorithm is arranged to control the controllable robotic actuator and the controllable gripper so as to place a gripping member near all four corners of the object, if the object is detected to have a rectangular shaped plane surface.

E33. The robot system according to any of E13 or E14, and to any of E27-E32, wherein the control system is arranged to process a plurality of said images of objects after being placed along with said plurality of inputs according to a learning algorithm, and to accordingly modify the control algorithm with respect to the processing of said plurality of inputs according to the predetermined algorithm to arrive at control parameters for controlling the controllable robotic actuator and the controllable gripper so as to grip the object.

E34. The robot system according to any of E1-E33, wherein the control algorithm is arranged to select which one of the identified objects to grip according to an object selection algorithm being arranged to
  analyse said image, and extract a plurality of different parameters indicative of the plurality of objects identified,
  calculate a score value for each of the plurality of objects identified in response to said plurality of different parameters in accordance with a predetermined score algorithm, and
  compare said score values and select the object to grip in response to a result of said comparison.

E35. The robot system according to E34, wherein said plurality of different parameters indicative of each of the plurality of objects identified comprises at least one of: a distance between the object and a current position of the gripper, a distance between the object and a target position where to place the object, a texture of an upper surface of the object, a curvature of an upper surface of the object, a tilting off an upper surface of the object, a height of an upper surface of the object compared to a height of surrounding objects, dimensions of the object, a type of the object, a shape of the object, and a quality of a part of said image covering the object, and wherein the control algorithm is arranged to assign, for each object, a parameter value for each of said plurality of different parameters according to a predetermined table, and wherein the control algorithm is arranged to calculate the overall score value for each object in response to the assigned parameter values.

E36. The robot system according to any of E13 or E14, and any of E34 or E35, wherein the control system is arranged to provide said image of an object after being placed at the target position as a feedback to the control algorithm with respect to the step of determining which object to grip among the plurality of objects identified, and wherein the control system comprises a learning algorithm arranged to modify one or more parameters in said predetermined score algorithm, based on a plurality of images of the objects after being placed at the target position, so as to improve pick and place performance.

E37. The robot system according to any of E1-E36, being arranged to receive the objects in bulk as a continuously moving stream of objects in bulk, and being arranged to grip the selected object from the moving objects in bulk.

E38. The robot system according to any of E1-E36, being arranged to receive a bulk of objects, and to pick and place all objects in the bulk before receiving another bulk of objects.

E39. The robot system according to any of E1-E38, being arranged to place the object singulated at the target position.

E40. The robot system according to any of E1-E39, being arranged to place the object oriented at the target position.

E41. A sorter system comprising
  a conveyor, such as being arranged for continuously moving, to transport objects of various shapes and sizes in bulk,
  a sorter arranged to receive singulated objects, and
  a first robot system according to any of E1-E39 arranged to pick up an object from the conveyor and to place the object singulated on an induction to the sorter or directly on the sorter.

E42. The sorter system according to E41, wherein the first robot system is arranged to place objects directly on the sorter upon the sorter moving at a constant speed.

E43. The sorter system according to E41, wherein the first robot system is arranged to place objects on an induction to the sorter.

E44. The sorter system according to any of E41-E43, wherein the conveyor is arranged for continuously moving.

E45. The sorter system according to any of E41-E44, wherein the conveyor and the sorter are placed adjacent to each other, wherein the conveyor has a first side facing a first side of the sorter, and wherein the controllable robotic actuator comprises a gantry type or cartesian type of robot actuator positioned with a first support at a position to the second side of the conveyor and a second support at a position to the second side of the sorter.

E46. The sorter system according to any of E41-E45, comprising a second pick and place robot system according to any of E1-E40, wherein the second robot system is positioned downstream of the conveyor compared to the first robot system.

E47. Use of the robot system according to any of E1-E40 for handling objects comprising at least one of: mail pieces, parcels, baggage, items handled at a warehouse distribution, and items handled at a mail order distribution centre.

E48. Use of the sorter system according to any of claims E41-E46 for handling objects comprising at least one of: mail pieces, parcels, baggage, items handled at a warehouse distribution, and items handled at a mail order distribution centre.

E49. A method for picking an object from objects in bulk, such as from a continuously moving stream of objects in bulk, and placing the object at a target position on an induction to a sorter or directly on a sorter, the method comprising
  providing a controllable gripper comprising a plurality of gripping members arranged to engage with a surface of the object to grip the object, wherein the gripping members are arranged in a controllable gripping configuration,
  providing a controllable robotic actuator arranged to move the controllable gripper,
  providing an image of objects of the moving stream of objects upstream of a position of the controllable robotic actuator, processing the image to identify objects therein,
selecting which one of the identified objects to grip,
determining properties of the selected object in response to the image,
controlling the gripping configuration of the gripping members in response to said properties of the selected object,
controlling the controllable robotic actuator to move the controllable gripper to a position for gripping the selected object,
controlling the controllable gripper to grip the selected object, and
controlling the controllable robotic actuator and the controllable gripper to move the object and releasing the object, e.g. singulated and/or oriented, at the target position on the induction to the sorter or directly on the sorter.

E50. The method according to E48, comprising controlling the controllable gripper to grip the selected object from the objects in bulk while the objects in bulk is moving.

E51. The method according to E48 or E49, comprising controlling the controllable gripper to grip the selected objects from a stationary bulk of objects.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A robot system arranged to receive objects in bulk as a continuously moving stream of objects in bulk, and being arranged to grip a selected object from the moving objects in bulk and to place the object at a target position on an induction to a sorter or directly on a sorter, the system comprising
    a pick and place robot comprising
        a controllable gripper comprising a plurality of gripping members arranged to engage with a surface of the object to grip the object, wherein the plurality of gripping members are arranged in a controllable gripping configuration, and
        a controllable robotic actuator arranged to move the controllable gripper,
    a sensor system arranged to provide an image of objects upstream of a position of the pick and place robot, and
    a control system arranged to receive said image and to execute a control algorithm arranged to
        identify objects in response to said image (IM),
        select which one of the identified objects to grip,
        control the gripping configuration of the plurality of gripping members in response to properties of the selected object determined from said image,
        control the controllable robotic actuator to move the controllable gripper to a position for gripping the selected object, and control the controllable gripper to grip the selected object,
        control the controllable robotic actuator and the controllable gripper to move the object and to release the object at the target position, and
        provide an image of the object after being placed at the target position, wherein the control system is arranged to provide said image of an object after being placed at the target position as a feedback to the control algorithm, and wherein the control system comprises a learning algorithm arranged to learn characteristics in the image of objects which have a high or low rate of success of being placed at the target position, based on a plurality of images of the objects after being placed at the target position.

2. The robot system according to claim 1, wherein the control system is arranged to compare the image of the object after being placed at the target position with the object in the image of objects provided by the sensor system.

3. The robot system according to claim 1, wherein the control system is arranged to generate an output in response to said comparison between the image of the object after being placed at the target position with the object in the image of objects provided by the sensor system.

4. The robot system according to claim 1, wherein the control system is arranged to provide an output indicative of a pick and place performance of the robot system in response to images of a plurality of objects after being placed at the target position.

5. The robot system according to claim 1, wherein the control algorithm comprises at least one algorithm part involving an artificial intelligence algorithm and/or a neural network algorithm for processing images of objects after being placed at the target position, so as to train one or more parts of the control algorithm to improve pick and place performance of the robot system.

6. The robot system according to claim 1, wherein the control system is arranged to provide an output indicative of a pick and place performance of the robot system in response to images of a plurality of objects after being placed at the target position.

7. The robot system according to claim 1, wherein the control algorithm of the control system is arranged to control the controllable robotic actuator and the controllable gripper to grip a selected object to be picked in response to a plurality of inputs determined from said image, wherein said plurality of inputs comprises at least one of: information regarding a shape of the object, a horizontal boundary of the object, a size of the object, an orientation of the object, an upper surface curvature of the object, and a surface roughness of the object,
    wherein the control algorithm processes the plurality of inputs according to a predetermined algorithm to arrive at control parameters for controlling the controllable robotic actuator and the controllable gripper so as to grip the object, and wherein the control algorithm is arranged to control a gripping configuration of the plurality of gripping members in response to said plurality of inputs, and
    wherein the control system is arranged to process a plurality of said images of objects after being placed along with said plurality of inputs according to a learning algorithm, and to accordingly modify the control algorithm with respect to the processing of said plurality of inputs according to the predetermined algorithm to arrive at control parameters for controlling the controllable robotic actuator and the controllable gripper so as to grip the object.

8. The robot system according to claim 1, comprising a sensor arranged to sense a height of the object after it has been picked up by the controllable gripper, wherein the control system is connected to said sensor and to receive information indicative of the height of the object, and wherein the control system is arranged to control release grip of the object at a height above the target position in response to said information indicative of the height of the object.

9. The robot system according to claim 1, wherein the controllable gripper comprises
- a base part arranged for mounting on the robotic actuator,
- four elongated arms mounted to the base part, wherein each arm
  - has a suction cup arranged at or near a distal end of the arm, wherein the suction cup is arranged for engaging with the object for gripping the object, and
  - is slidably arranged along an axis actuated by a controllable actuator, so as to allow the arm to be controllably adjusted with respect to a position of the suction cup relative to the base part, and
- wherein the four arms are slidably arranged in different directions relative to the base part, so as to allow the four suction cups to form various gripping quadrangle sizes.

10. The robot system according to claim 1, wherein the control system is arranged to control the controllable gripper to cause the gripping members to form a predetermined gripping configuration, in order to prepare for gripping the object.

11. The robot system according to claim 1, being arranged to receive the objects in bulk as a continuously moving stream of objects in bulk, and being arranged to grip the selected object from the moving objects in bulk.

12. The robot system according to claim 1, being arranged to place the object singulated and oriented at the target position.

13. The robot system according to claim 1, comprising a second sensor system arranged to provide an image of objects at a gripping area.

14. The robot system according to claim 13, wherein the control system is arranged to compare the image of objects at gripping area with the image of objects at the position upstream of the of the gripping area, and to detect if one or more objects have changed position relative to a surface of a feeding conveyor.

15. The robots system according to claim 13, wherein the control system is arranged to detect a malfunction of the robot system in response to the image of objects at a gripping area, such as being arranged to generate an alarm signal in case a malfunction is detected.

16. The robot system according to claim 1, comprising a plurality of pick and place robots arranged for being positioned along a feeding conveyor, each of the plurality of pick and place robots comprising
- a controllable gripper comprising a plurality of gripping members arranged to engage with a surface of the object to grip the object, wherein the plurality of gripping members are arranged in a controllable gripping configuration, and
- a controllable robotic actuator in a Cartesian or gantry configuration and being arranged to move the controllable gripper.

17. A sorter system comprising
- the robot system according to claim 1,
- a conveyor arranged for continuously moving objects of various shapes and sizes in bulk,
- a sorter arranged to receive singulated objects, and
- wherein the robot system is arranged to pick up an object from the conveyor and to place the object singulated on an induction to the sorter or directly on the sorter.

* * * * *